US012693567B2

(12) United States Patent
He et al.

(10) Patent No.: US 12,693,567 B2
(45) Date of Patent: Jul. 28, 2026

(54) ELECTROCHROMIC DEVICE

(71) Applicant: SHENZHEN GUANGYI TECH CO., LTD., Shenzhen (CN)

(72) Inventors: Jiazhi He, Shenzhen (CN); Jiacheng Li, Shenzhen (CN); Zhirui Shi, Shenzhen (CN)

(73) Assignee: SHENZHEN GUANGYI TECH CO. LTD., Guangdong (CN)

( * ) Notice: Subject to any disclaimer, the term of this patent is extended or adjusted under 35 U.S.C. 154(b) by 572 days.

(21) Appl. No.: 18/116,087

(22) Filed: Mar. 1, 2023

(65) Prior Publication Data

US 2023/0205035 A1 Jun. 29, 2023

Related U.S. Application Data

(63) Continuation of application No. PCT/CN2021/079013, filed on Mar. 4, 2021.

(30) Foreign Application Priority Data

Sep. 1, 2020 (CN) .......................... 202021885562.6
Sep. 3, 2020 (CN) .......................... 202021899369.8
(Continued)

(51) Int. Cl.
*G02F 1/161* (2006.01)
*G02F 1/153* (2006.01)
(Continued)

(52) U.S. Cl.
CPC ...... *G02F 1/161* (2013.01); *G02F 2001/1536* (2013.01); *G02F 1/163* (2013.01); *G02F 2202/28* (2013.01); *H02J 50/10* (2016.02)

(58) Field of Classification Search
CPC .. G02F 1/161; G02F 1/163; G02F 2001/1536; G02F 2202/28; H02J 50/10
See application file for complete search history.

(56) References Cited

U.S. PATENT DOCUMENTS 6,061,168 A 5/2000 Ishima et al.
2002/0075552 A1* 6/2002 Poll .......................... G02F 1/161
359/275
(Continued)

FOREIGN PATENT DOCUMENTS

CN 1380990 A 11/2002
CN 1510494 A 7/2004
(Continued)

OTHER PUBLICATIONS

International Search Report with English Translation for PCT Application No. PCT/CN2021/116339, dated Dec. 9, 2021, pp. 1-4.
(Continued)

*Primary Examiner* — George G. King
(74) *Attorney, Agent, or Firm* — TechLaw Ventures, PLLC; Terrence J. Edwards

(57) ABSTRACT

Provided is an electrochromic device. The electrochromic device includes a first additional layer, a first base layer, an electrochromic layer, a second base layer, and a second additional layer stacked in sequence. Two ends of the electrochromic layer are flush with two ends of the first base layer. Two ends of the second base layer and two ends of the second additional layer are disposed beyond the two ends of the electrochromic layer. A first sealing element is disposed around the electrochromic layer and on the second base layer.

18 Claims, 17 Drawing Sheets

(30) Foreign Application Priority Data

| | | | |
|---|---|---|---|
| Sep. 4, 2020 | (CN) | .......................... | 202010920683.8 |
| Sep. 4, 2020 | (CN) | .......................... | 202021912116.X |
| Sep. 7, 2020 | (CN) | .......................... | 202010929900.X |
| Sep. 7, 2020 | (CN) | .......................... | 202010929901.4 |
| Sep. 7, 2020 | (CN) | .......................... | 202021948559.4 |

(51) Int. Cl.

| | |
|---|---|
| *G02F 1/163* | (2006.01) |
| *H02J 50/10* | (2016.01) |

(56) References Cited

U.S. PATENT DOCUMENTS

| | | | |
|---|---|---|---|
| 2003/0133177 A1* | 7/2003 | Tonar | B60R 1/088 |
| | | | 359/267 |
| 2004/0160657 A1 | 8/2004 | Tonar et al. | |
| 2007/0152956 A1 | 7/2007 | Danner et al. | |
| 2009/0052006 A1 | 2/2009 | Xu et al. | |
| 2009/0303565 A1 | 12/2009 | Karmhag et al. | |
| 2011/0222139 A1 | 9/2011 | Naijo et al. | |
| 2012/0019889 A1 | 1/2012 | Lamine et al. | |
| 2014/0268279 A1 | 9/2014 | Veenman et al. | |
| 2014/0376075 A1 | 12/2014 | Dubrenat et al. | |
| 2018/0024401 A1 | 1/2018 | Stray et al. | |
| 2018/0081249 A1 | 3/2018 | Choi et al. | |
| 2018/0107085 A1 | 4/2018 | Jung et al. | |
| 2019/0006538 A1 | 1/2019 | Cho et al. | |
| 2020/0150507 A1 | 5/2020 | Chen et al. | |

FOREIGN PATENT DOCUMENTS

| | | | |
|---|---|---|---|
| CN | 1643444 A | 7/2005 | |
| CN | 1949070 A | 4/2007 | |
| CN | 101297340 A | 10/2008 | |
| CN | 101445723 A | 6/2009 | |
| CN | 102460292 A | 5/2012 | |
| CN | 102662276 A | 9/2012 | |
| CN | 102929063 A | 2/2013 | |
| CN | 103869551 A | 6/2014 | |
| CN | 105093629 A | 11/2015 | |
| CN | 106926781 A | 7/2017 | |
| CN | 107422565 A | 12/2017 | |
| CN | 108646495 A | 10/2018 | |
| CN | 108646497 A | 10/2018 | |
| CN | 109073949 A | 12/2018 | |
| CN | 110471230 A | 11/2019 | |
| CN | 209765230 U | 12/2019 | |
| CN | 110928096 A | 3/2020 | |
| CN | 111399300 A | 7/2020 | |
| CN | 111443545 A | 7/2020 | |
| CN | 111580320 A | 8/2020 | |
| CN | 112394581 A | 2/2021 | |
| CN | 112394583 A | 2/2021 | |
| CN | 112415827 A | 2/2021 | |
| CN | 212623492 U | 2/2021 | |
| CN | 212623493 U | 2/2021 | |
| DE | 102009058136 A1 | 6/2011 | |
| JP | H10197907 A | 7/1998 | |
| JP | 2018132718 A | 8/2018 | |
| JP | 2019191481 A | 10/2019 | |
| KR | 20090102113 A | 9/2009 | |
| KR | 20170102188 A | 9/2017 | |
| WO | 2018193822 A1 | 10/2018 | |

OTHER PUBLICATIONS

International Search Report with English Translation for PCT Application No. PCT/CN2021/079013, dated Jun. 3, 2021, pp. 1-8.
First Office Action with English Translation for Chinese Application No. 202110826680.2, pp. 1-10.
First Office Action with English Translation for Chinese Application No. 202010929900.X, pp. 1-16.
Second Office Action with English Translation for Chinese Application No. 202010929900.X, pp. 1-8.
Wu et al., "High-Performance Electrofl uorochromic Devices Based on Electrochromism and Photoluminescence-Active Novel Poly(4-Cyanotriphenylamine)," Advanced Functional Materials Journal, 2014, pp. 1-8.
Janxiang et al., "Advances in Inorganic All-solid-state Electrochromic Materials and Devices," Journal of Inorganic Materials, May 2020, pp. 1-14, vol. 35, No. 5.

* cited by examiner

ELECTROCHROMIC DEVICE

CROSS-REFERENCE TO RELATED APPLICATIONS

This is a continuation of International Patent Application No. PCT/CN2021/079013, filed Mar. 4, 2021, which claims priority to Chinese Patent Application No. 202021885562.6 filed Sep. 1, 2020, Chinese Patent Application No. 202021899369.8 filed Sep. 3, 2020, Chinese Patent Application No. 202021912116.X filed Sep. 4, 2020, Chinese Patent Application No. 202010920683.8 filed Sep. 4, 2020, Chinese Patent Application No. 202010929901.4 filed Sep. 7, 2020, Chinese Patent Application No. 202021948559.4 filed Sep. 7, 2020, and Chinese Patent Application No. 202010929900.X filed Sep. 7, 2020, the disclosures of which are incorporated herein by reference in their entireties.

TECHNICAL FIELD

The present application relates to the technical field of electro-optic components, for example, an electrochromic device and manufacturing methods therefor.

BACKGROUND

Electrochromism refers to the phenomenon that the optical properties (for example, reflectance, transmittance, absorption, and so on) of materials undergo stable and reversible color changes under the effect of an external electric field, which is manifested as reversible changes in color and transparency in appearance. To ensure that the electrochromic device is isolated from water and oxygen, the core layer of the electrochromic device is usually sealed with a sealant, but the existing sealing method is prone to crack and fall off after long-term use.

SUMMARY

The present application proposes an electrochromic device. The electrochromic device has a better sealing performance, a less probability of cracking and failing of sealing elements, and a higher serviceability.

The present application proposes a manufacturing method for an electrochromic device. The process of the manufacturing method is relatively simple. The method can improve the connection stability of sealing elements to other layers, reduce the probability of cracking and failing of the sealing elements, and improve the serviceability of the electrochromic device.

The present application provides an electrochromic device. The electrochromic device includes a first additional layer, a first base layer, an electrochromic layer, a second base layer, and a second additional layer that are stacked in sequence. Two ends of the electrochromic layer are flush with two ends of the first base layer, two ends of the second base layer and two ends of the second additional layer are disposed beyond the two ends of the electrochromic layer, and a first sealing element is disposed around the electrochromic layer and on the second base layer.

The present application also provides a manufacturing method for the preceding electrochromic device. The method includes forming a multilayer structure comprising the first base layer, the electrochromic layer, and the second base layer stacked in sequence; placing the multilayer structure such that the first base layer faces upward, and etching the multilayer structure from a surface of the first base layer to the second base layer to form a first groove; pouring a first sealant into the first groove; superimposing the first additional layer on the first base layer, and curing the first sealant to form the first sealing element; and removing a redundant part of the multilayer structure outside the first sealing element.

The present application also provides a method for the preceding electrochromic device. The method includes forming a multilayer structure comprising the first base layer, the electrochromic layer, and the second base layer stacked in sequence; placing the multilayer structure such that the first base layer faces upward, and etching the multilayer structure from a surface of the first base layer to the second base layer to form a first groove; pouring a first sealant into the first groove; superimposing the first additional layer on the first base layer, and curing the first sealant to form the first sealing element; removing a redundant part of the multilayer structure outside the first sealing element; placing the multilayer structure such that the second base layer faces upward, and etching the multilayer structure from a surface of the second base layer to a surface or interior of the first sealing element to form a second groove; pouring a second sealant into the second groove; and superimposing the second additional layer on the second base layer, and curing the second sealant to form the second sealing element.

REFERENCE LIST

Figure 1:
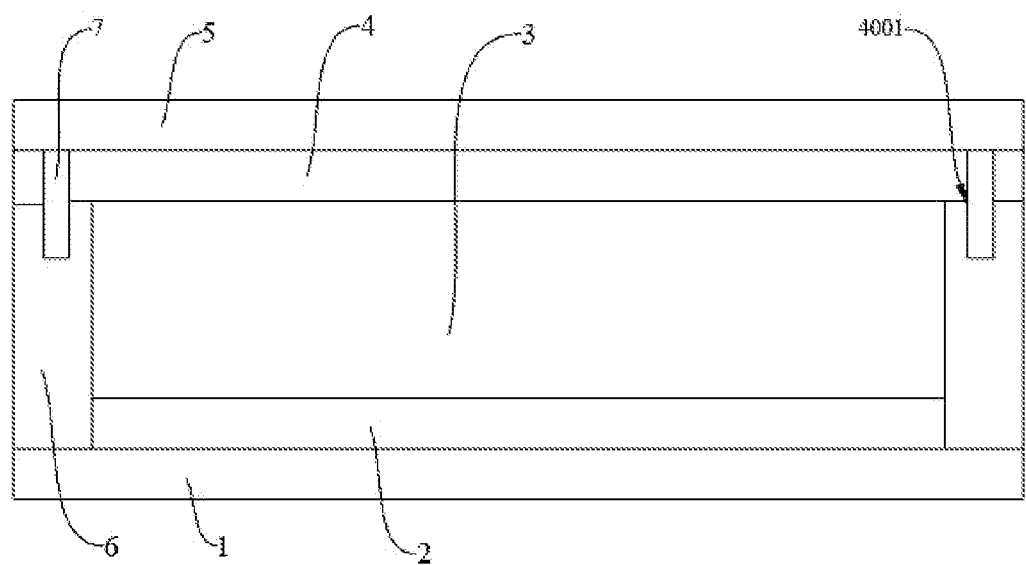
FIG. 1 is a diagram illustrating the structure of an electrochromic device according to an embodiment of the present application.

1 first additional layer
2 first base layer

201 first substrate layer
202 first transparent conductive layer
3 electrochromic layer
301 electrochromic material layer
302 electrolyte layer
303 ion storage layer
4 second base layer
401 second substrate layer
402 second transparent conductive layer
4021 first conductive region
4022 second conductive region
4001 sealing hole
4002 sealing groove
5 second additional layer
6 first sealing element
601 first sealing part
602 second sealing part
7 second sealing element
8 first adhesive layer
9 second adhesive layer
10 first external protective layer
11 decorative layer
12 reflective layer
13 second external protective layer
14 blocking layer
15 first electrochromic region
16 wiring region
161 first wiring region
162 second wiring region
17 second electrochromic region
18 cover plate
181 first region
182 second region
19 third adhesive layer
20 conductive multilayer structure
2001 base protective layer
2002 base conductive layer
2003 underlayer
2004 barrier layer
21 base substrate layer
22 ink layer
23 color layer
24 partition groove
25 conductive via
26 conductive member
27 conductor
28 wireless receiving coil
29 AC/DC converter circuit
30 first electrode
31 second electrode
32 first shielding layer
33 second shielding layer
34 third external protective layer
35 preset hole

DETAILED DESCRIPTION

In the description of the present application, it is to be understood that an orientation or position relationship indicated by a term such as "center", "longitudinal", "lateral", "length", "width", "thickness", "above", "below", "front", "back"," "left", "right", "vertical", "horizontal", "top", "bottom", "inside", "outside", "clockwise", "counterclockwise", "axial", "radial", or "circumferential" is based on an orientation or position relationship of a figure. The term is intended to facilitate and simplify the description of the present application and not to indicate or imply that the apparatus or element referred to has a specific orientation and is constructed and operated in a specific orientation. Therefore, the term is not to be construed as limiting the present application.

In addition, a feature defined as a "first" feature or a "second" feature may explicitly or implicitly expresses that one or more of such features is introduced to distinguish and describe features regardless of order or weight. In the description of the present application, unless otherwise noted, the term "a plurality of" or "multiple" means two or more.

In the description of the present application, it is to be noted that unless otherwise expressly specified and limited, the term "mounted", "connected to each other" or "connected" should be construed in a broad sense. For example, "connected" may be fixedly connected, detachably connected or integrally connected; mechanically connected or electrically connected; directly connected to each other or indirectly connected to each other via an intermediary; or intraconnected between two components. For those of ordinary skill in the art, specific meanings of the preceding terms in the present application may be construed according to specific situations.

The structure of an electrochromic device of each embodiment of the present application is described below with referring to FIGS. 1 to 31.

The present application provides an electrochromic device, as shown in FIGS. 1 to 11. The electrochromic device includes a first additional layer 1, a first base layer 2, an electrochromic layer 3, a second base layer 4 and a second additional layer 5 that are stacked in sequence. Two ends of the electrochromic layer 3 are flush with two ends of the first base layer 2, two ends of the second base layer 4 and two ends of the second additional layer 5 are disposed beyond the two ends of the electrochromic layer 3, and a first sealing element 6 is disposed around the electrochromic layer 3 and on the second base layer 4.

In an exemplary embodiment, there are two situations regarding the first additional layer 1, the first base layer 2, the electrochromic layer 3, the second base layer 4 and the second additional layer 5 that are stacked in sequence in practical situations. In situation 1 as shown in FIGS. 1 to 5, the first additional layer 1 is located at the lowermost end, and the first base layer 2, the electrochromic layer 3, the second base layer 4 and the second additional layer 5 are stacked sequentially from bottom to top. In situation 2 as shown in FIGS. 6 to 11, the first additional layer 1 is located at the uppermost end, and the first base layer 2, the electrochromic layer 3, the second base layer 4 and the second additional layer 5 are stacked sequentially from top to bottom.

Figure 5:
FIG. 5 is a diagram illustrating the structure of an electrochromic device according to an embodiment of the present application.
Figure 11:
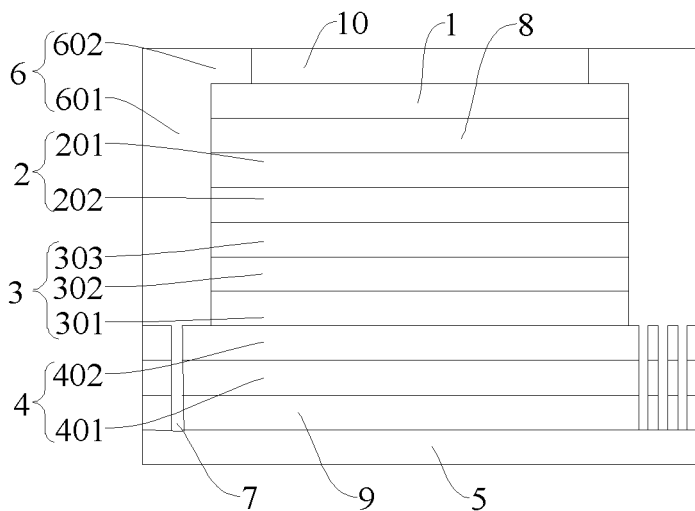
FIG. 11 is a diagram illustrating the structure of an electrochromic device according to an embodiment of the present application.
Figure 12:
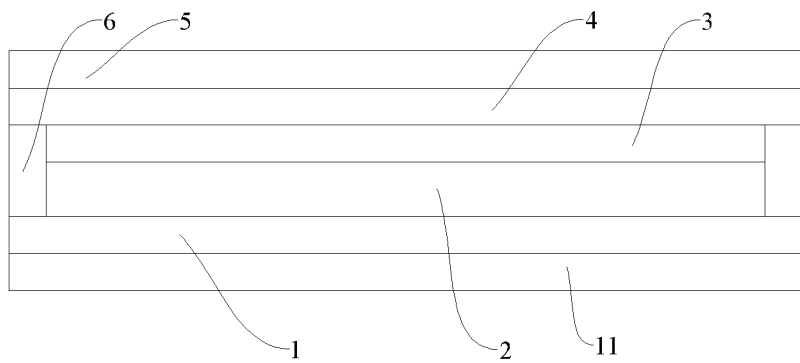
FIG. 12 is a diagram illustrating the structure of an electrochromic device according to an embodiment of the present application.
Figure 13:
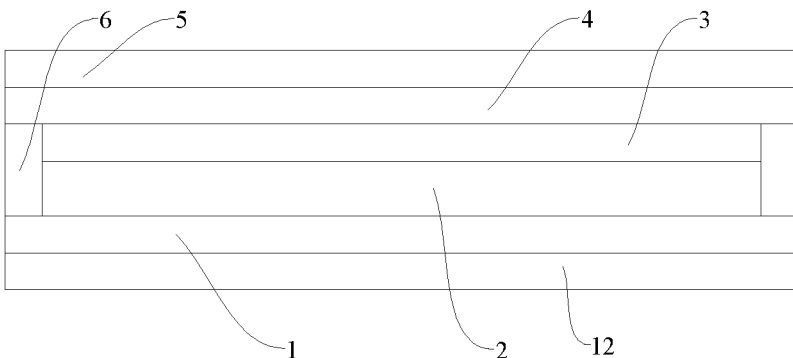
FIG. 13 is a diagram illustrating the structure of an electrochromic device according to an embodiment of the present application.

In the present application as shown in FIG. 5 and FIG. 11, the first base layer 2 may include a first substrate layer 201 and a first transparent conductive layer 202 that are stacked, and the second base layer 4 may include a second substrate layer 401 and a second transparent conductive layer 402 that are stacked. The first substrate layer 201 and the second substrate layer 401 of the present application are made of optically transparent materials, such as flexible substrate materials like like Polyethylene terephthalate (PET), cyclic olefin copolymer and cellulose triacetate. The first transparent conductive layer 202 and the second transparent conductive layer 402 may adopt transparent conductive materials well known to those skilled in the art, such as indium-tin oxide (indium-tin oxide, ITO), aluminum zinc oxide (aluminum zinc oxide, AZO), fluorine doped tin oxide (fluorine doped tin oxide, FTO), silver nanowire, graphene, carbon nanotube, metal mesh or silver nanoparticle, and so on. Materials adopted by the first sealing element 6 and the second sealing element 7 include any one of adhesives conventional in the art with insulating effect and water-oxygen barrier effect, such as pressure-sensitive adhesive, hot melt adhesive, Ultra Violet (UV) light-curing adhesive, heat-curing adhesive and UV thermal dual-curing adhesive.

As shown in FIG. 5 and FIG. 11, the electrochromic layer 3 includes an electrochromic material layer 301, an electrolyte layer 302 and an ion storage layer 303 that are stacked in sequence. The electrochromic material layer 301 is connected to the first base layer 2, and the ion storage layer 303 is connected to the second base layer 4. Materials adopted by each layer in the electrochromic layer 3 may include those already provided in the related art, so details are not described herein. In other embodiments, the electrochromic material layer 301 may be connected to the second base layer 4, and the ion storage layer 303 may be connected to the first base layer 2.

In practical use, the first base layer 2 and the second base layer 4 cannot completely block water and oxygen, although they play a role in blocking water vapor. By disposing the first additional layer 1 on the outside of the first base layer 2, the first additional layer 1 can better block the external water vapor and oxygen, thereby preventing the water vapor and oxygen from entering the electrochromic layer 3 through the first base layer 2 and thus from affecting the normal working of the electrochromic layer 3. At the same time, the inner side of the second base layer 4 is facing the inside of the electrochromic device, and the outer side of the second base layer 4 is provided with a second additional layer 5 which can better prevent external water vapor and oxygen from passing through the second base layer 4 and thus from affecting the electrochromic layer 3. Since the first sealing element 6 is disposed around the electrochromic layer 3 and on the second base layer 4, the sealing performance of the entire electrochromic device is improved, and the external water vapor and oxygen are better prevented from entering the electrochromic layer 3 from its side and thus from affecting the stability of the electrochromic layer 3.

In some embodiments as shown in FIGS. 1 to 5 and FIGS. 9 to 11, the electrochromic device further includes a second sealing element 7 embedded in the second base layer 4, with one end of the second sealing element 7 abutting on the first sealing element 6 or one end of the second sealing element 7 embedded in the first sealing element 6. Since the second base layer 4 is provided with the second sealing element 7, in the first place, the phenomenon that external water vapor and oxygen pass through a side of the second base layer 4 and thus affect the stability of the electrochromic layer 3 can be better avoided. In the second place, the second sealing element 7 can enhance the connection stability of the second base layer 4 to the second additional layer 5, thereby reducing the probability of the second additional layer 5 falling off. In the third place, one end of the second sealing element 7 is connected to or inserted into the first sealing element 6, so that the second sealing element 7 and the first sealing element 6 form a structure of mutual insertion, which further improves the connection stability of the first sealing element 6 and reduces the probability of the first sealing element 6 falling off, thereby improving the product stability of the electrochromic device.

In an embodiment, bonding, coating, or evaporation may be adopted for the connection between the electrochromic layer 3, the first base layer 2, and the second base layer 4.

A specific connection manner may be selected according to actual needs, and the connection process between the layers is not limited herein.

In an exemplary embodiment, the first base layer 2 and the second base layer 4 are both a flexible layer, and the first additional layer 1 and the second additional layer 5 may be flexible layers or rigid layers, such as commercially available flexible water and oxygen barrier films or rigid glass layers. Therefore, the first base layer 2 and the second base layer 4, as well as the first additional layer 1 and the second additional layer 5 may adopt a flexible layer or a rigid layer according to usage scenarios of the electrochromic device, so as to expand the scope of application of the electrochromic device in the embodiment and enhance its market competitiveness. In an example, the second additional layer 5 may be glass layer. In an embodiment, the second additional layer 5 may also adopt other layers according to actual needs.

Figure 4:
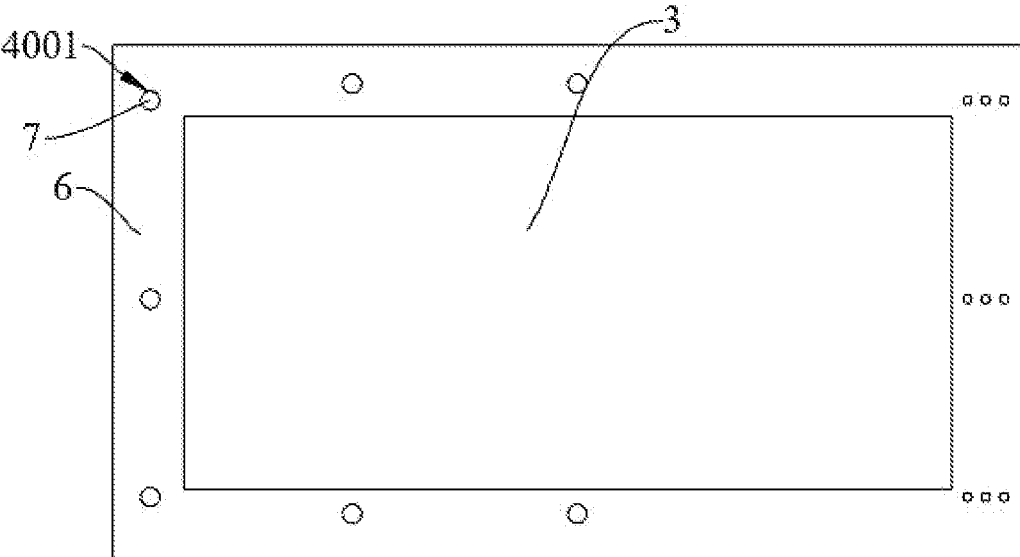
FIG. 4 is another diagram illustrating the structure of the electrochromic device of FIG. 3.
Figure 10:
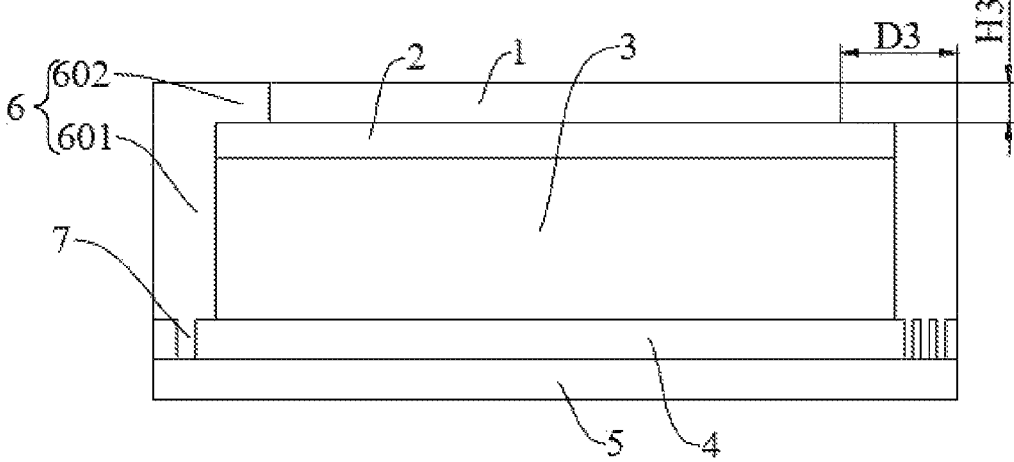
FIG. 10 is a diagram illustrating the structure of an electrochromic device according to an embodiment of the present application.

In some embodiments as shown in FIGS. 1, 4 and 10, the second base layer 4 is provided with a plurality of sealing holes 4001 spaced apart in the peripheral direction of the second base layer 4, and each of the plurality of sealing holes 4001 is filled with one second sealing element 7. Therefore, the plurality of second sealing elements 7 can not only improve the water and oxygen barrier capability of the second base layer 4, further improve the connection stability of the second base layer 4 to the second additional layer 5, and reduce the probability of the second additional layer 5 falling off, but also further enhance the connection stability of the first sealing element 6 and reduce the probability of cracking and falling off of the first sealing element 6. In an example, the plurality of sealing holes 4001 may be uniformly or non-uniformly distributed, and the sizes and shapes of the plurality of sealing holes 4001 may be uniform or non-uniform. Selection may be made according to actual needs.

Figure 2:
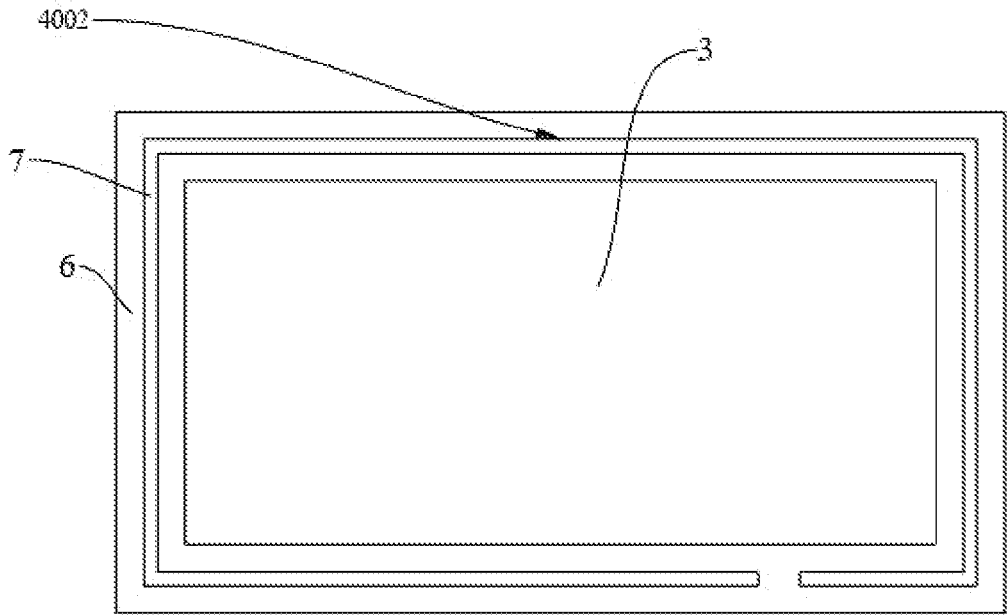
FIG. 2 is another diagram illustrating the structure of the electrochromic device of FIG. 1.
Figure 3:
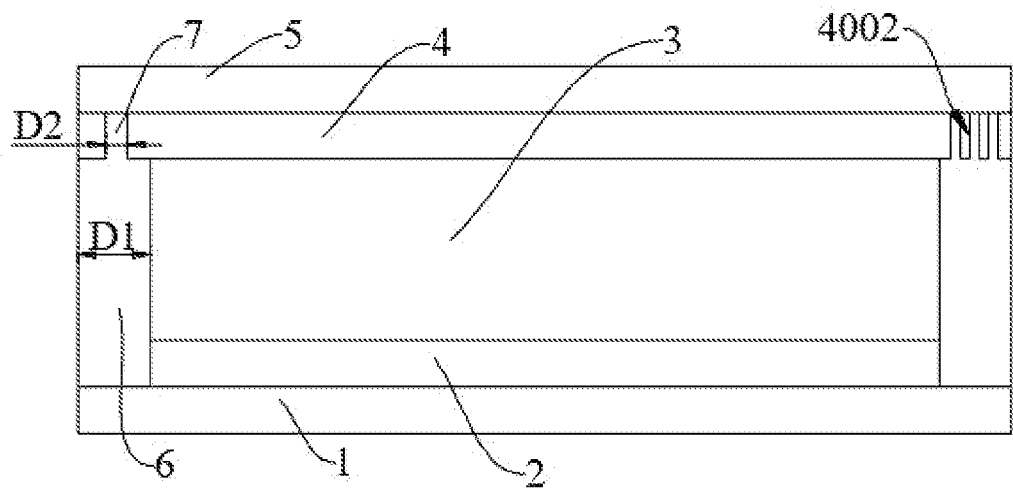
FIG. 3 is a diagram illustrating the structure of an electrochromic device according to an embodiment of the present application.
Figure 9:
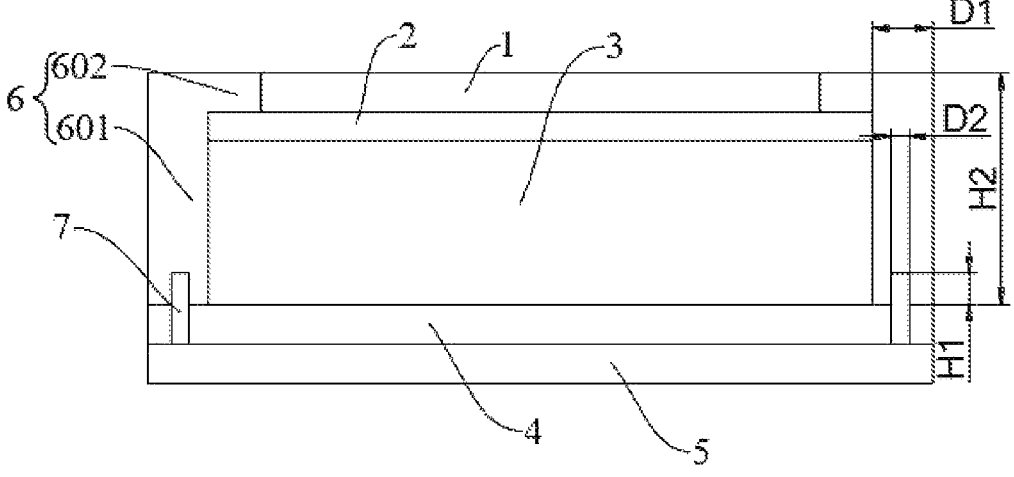
FIG. 9 is a diagram illustrating the structure of an electrochromic device according to an embodiment of the present application.

In some embodiments as shown in FIGS. 3, 2 and 9, the second base layer 4 is provided with a sealing groove 4002 extending in the peripheral direction of the second base layer 4. Two ends of the sealing groove 4002 are spaced apart in the peripheral direction of the second base layer 4, and the sealing groove 4002 is filled with the second sealing element 7. Compared with the technical solution of filling the sealing holes 4001 with the second element 7, filling the sealing groove 4002 with the second element 7 brings more contact area with the first sealing element 6 and the second additional layer 5, thereby further improving the connection stability of the second base layer 4 to the second additional layer 5, reducing the probability of the second additional layer 5 falling off, further improving the connection stability of the first sealing element 6, and reducing the probability of cracking and falling off of the first sealing element 6. If the sealing groove 4002 is a whole ring, this may cause the second base layer 4 to be divided into two parts spaced apart, which is inconvenient to lead out a wire of the electrochromic layer 3. The two ends of the sealing groove 4002 are spaced apart, which indicates that the second base layer 4 is not completely separated and helps lead out a wire of the electrochromic layer 3 and thus facilitates the use of the electrochromic device provided in the embodiment of the present application. In the embodiment of the present application, the number of sealing grooves 4002 may be one or more spaced apart.

Materials of the first sealing element 6 and the second sealing element 7 are determined by adhesion between the materials and the bonding surface, and the water and oxygen barrier capability of the materials, so as to ensure both the adhesion between the materials and the bonding surface and appropriate water and oxygen barrier capability. In an example, a bonding material with a bonding pull-out force of greater than or equal to 10 N between the first sealing element 6 and the bonding surface and between the second sealing element 7 and the bonding surface may be selected. The materials selected for the first sealing element 6 and the second sealing element 7 may be uniform or non-uniform.

In some embodiments as shown in FIG. 5, a first adhesive layer 8 is disposed on a side of the first base layer 2 facing the first additional layer 1, and a second adhesive layer 9 is disposed on a side of the second base layer 4 facing the second additional layer 5. In this manner, the connection strength between the first additional layer 1 and the first base layer 2 can be ensured, the probability of the first additional layer 1 falling off is reduced, and the serviceability of the entire electrochromic device is ensured.

In addition, when the electrochromic device in the embodiment of the present application is manufactured, the first sealing element 6 is formed by curing after pouring a sealant, that is, etching from a surface of the first base layer 2 to a surface of the second base layer 4 to form a groove for pouring a sealant, pouring the sealant into the groove, then superimposing the first additional layer 1 on the first base layer 2, and curing the sealant to form the first sealing element 6. Compared with the adhesive ability between the first adhesive layer 8 and the first sealing element 6, the adhesive ability between the first sealing element 6 and the first additional layer 1 is stronger. If the first adhesive layer 8 is disposed on the first additional layer 1, the first adhesive layer 8 is in direct contact with the first sealing element 6 when the first additional layer 1 is superimposed on the first base layer 2, which is not conducive to improving the connection stability of the first additional layer 1 to the first sealing element 6. In the embodiment of the present application, the first adhesive layer 8 is disposed on the first base layer 2, and part of the first adhesive layer 8 is removed when etching the groove for pouring the sealant, so that when the first additional layer 1 is superimposed on the first base layer 2, the first additional layer 1 is in direct contact with the first sealing element 6, which improves the connection stability of the first additional layer 1 to the first sealing element 6.

In an exemplary embodiment, in the embodiment of the present application, the first adhesive layer 8 may adopt any one or a combination of at least two of Polyvinyl Butyral (Polyvinyl Butyral, PVB), Ethylene-vinyl Acetate Copolymer (Ethylene-vinyl Acetate Copolymer, EVA), OCA Optically Clear Adhesive (Optically Clear Adhesive, OCA), SCA Optically Clear Adhesive, ionoplast interlayer (Sentry Glas Plus, SGP), Liquid Optical Clear Adhesive LOCA (Liquid Optical Clear Adhesive, LOCA) or acrylic. In other embodiments of the present application, the first adhesive layer 8 may adopt other adhesive materials and is not limited to the above description. In an embodiment, the first additional layer 1 and the first base layer 2 may also be connected by other processes such as evaporation. The process is not limited to bonding.

In some embodiments as shown in FIG. 5, a second adhesive layer 9 is disposed on a side of the second base layer 4 facing the second additional layer 5. In this manner, the connection strength between the second additional layer 5 and the second base layer 4 can be ensured, the probability of the second additional layer 5 falling off can be reduced, and the serviceability of the entire electrochromic device can be ensured.

In addition, when the electrochromic device in the embodiment of the present application is manufactured, the second sealing element 7 is formed by curing after pouring a sealant, that is, etching from a surface of the second base layer 4 to a surface of the first sealing element 6 to form a groove for pouring a sealant, pouring the sealant into the groove, then superimposing the second additional layer 5 on the second base layer 4, and curing the sealant to form the second sealing element 7. Compared with the adhesive ability between the second adhesive layer 9 and the second sealing element 7, the adhesive ability between the second sealing element 7 and the second additional layer 5 is stronger. If the second adhesive layer 9 is disposed on the second additional layer 5, the second adhesive layer 9 is in direct contact with the second sealing element 7 when the second additional layer 5 is superimposed on the second base layer 4, which is not conducive to improving the connection stability of the second additional layer 5 to the second sealing element 7. In the embodiment of the present application, the second adhesive layer 9 is disposed on the second base layer 4, and part of the second adhesive layer 9 is removed when etching the groove for pouring the sealant, so that when the second additional layer 5 is superimposed on the second base layer 4, the second additional layer 5 is in direct contact with the second sealing element 7, which improves the connection stability of the second additional layer 5 to the second sealing element 7.

In an exemplary embodiment, in this embodiment, the second adhesive layer 9 may adopt any one or a combination of at least two of Polyvinyl Butyral (Polyvinyl Butyral, PVB), Ethylene-vinyl Acetate Copolymer (Ethylene-vinyl Acetate Copolymer, EVA), OCA (Optically Clear Adhesive) Optically Clear Adhesive, SCA Optically Clear Adhesive, ionoplast interlayer (Sentry Glass Plus, SGP)), Liquid Optical Clear Adhesive LOCA (Liquid Optical Clear Adhesive) or acrylic. In other embodiments of the present application, the second adhesive layer 9 may adopt other adhesive materials and is not limited to the above description. In an embodiment, the second additional layer 5 and the second base layer 4 may also be connected by other processes such as evaporation. The process is not limited to bonding.

In some embodiments as shown in FIGS. 6 to 11, the first sealing element 6 includes a first sealing part 601 and a second sealing part 602. The first sealing part 601 is disposed circumferentially in a peripheral area of the electrochromic layer 3, where a first end of the first sealing part 601 is connected to the second base layer 4, and a second end of the first sealing part 601 is connected to the second sealing part 602. The second sealing part 602 is located on a side of the electrochromic layer 3 facing the first base layer 2. Since the first sealing element 6 includes the first sealing part 601 at both ends of the electrochromic layer 3 and the second sealing part 602 on a side of the electrochromic layer 3 facing the first base layer 2, the contact area between the first sealing element 6 and other layers is increased, so that the connection strength between the first sealing element 6 and other layers is improved and the first sealing element 6 is prevented from cracking or even falling off from a side of the electrochromic layer 3.

Figure 6:
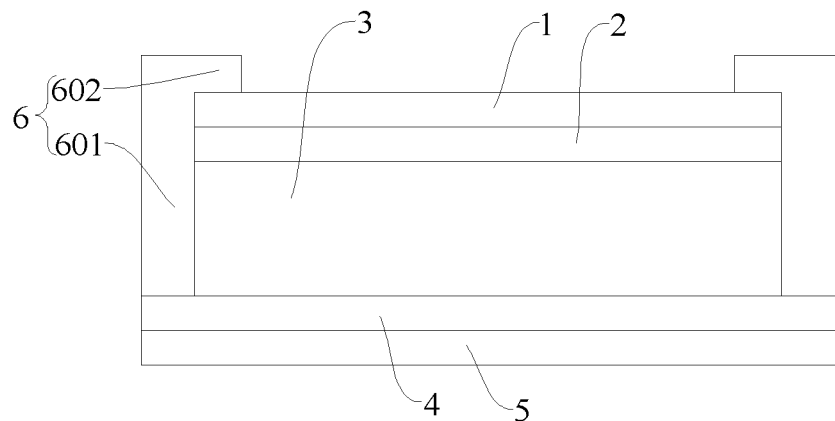
FIG. 6 is a diagram illustrating the structure of an electrochromic device according to an embodiment of the present application.

In some embodiments as shown in FIG. 6, the second sealing part 602 is located outside the first base layer 2. The second sealing part 602 is located outside the first base layer 2, which means that the first base layer 2 and the electrochromic layer 3 are sandwiched between the second sealing part 602 and the second base layer 4. In this manner, the connection stability of the first base layer 2 to the electrochromic layer 3 is improved, so as to avoid the falling off of the first base layer 2. In an example, the first additional layer 1 is provided between the second sealing part 602 and the first base layer 2. The first additional layer 1 may be a functional layer such as a water and oxygen barrier layer, and the surface of the first additional layer 1 is flush with the surface of the second sealing part 602, which can not only improve the water and oxygen barrier performance of the entire electrochromic device, but also improve the connection stability of the first additional layer 1 to the first base layer 2, thereby preventing the functional layer from falling off.

Figure 7:
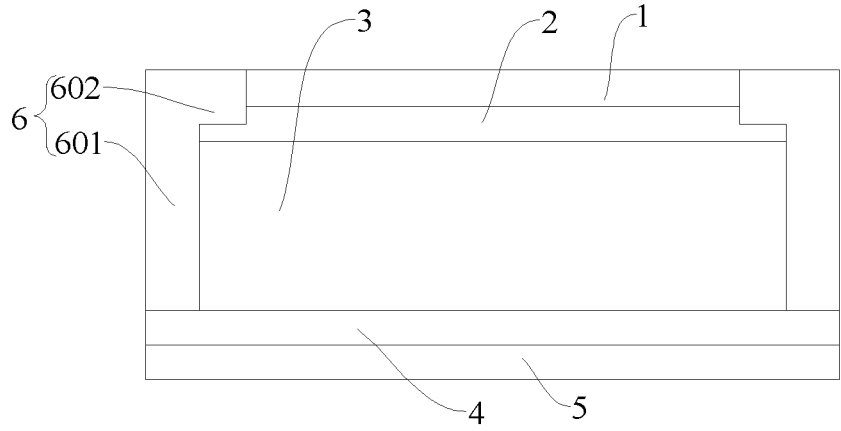
FIG. 7 is a diagram illustrating the structure of an electrochromic device according to an embodiment of the present application.
Figure 8:
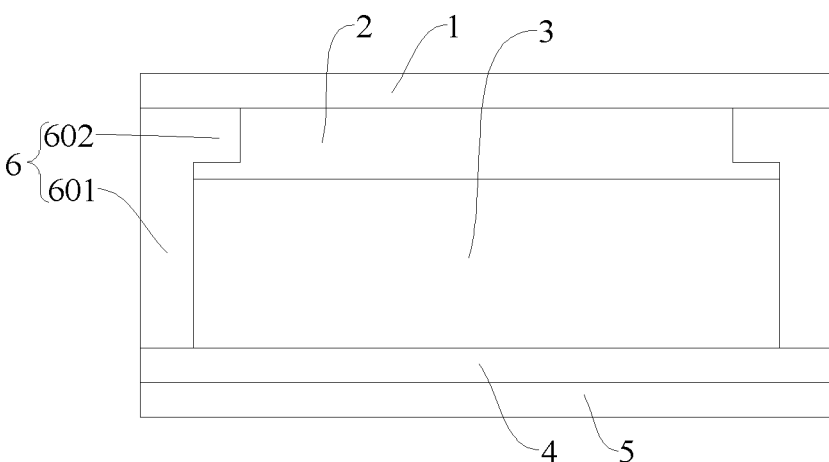
FIG. 8 is a diagram illustrating the structure of an electrochromic device according to an embodiment of the present application.

In some embodiments as shown in FIGS. 7 and 8, at least part of the second sealing part 602 is embedded in the first base layer 2. In some embodiments as shown in FIG. 8, the second sealing part 602 is completely embedded in the first base layer 2. In some embodiments as shown in FIG. 7, one part of the second sealing part 602 extends beyond the first base layer 2, and the other part is embedded in the first base layer 2. Regardless of the above methods, compared with a technical solution in which the second sealing part 602 is located outside the first base layer 2, the contact area between the second sealing part 602 and the first base layer 2 in this embodiment is larger, which further improves the connection stability of the first sealing element 6 to the first base layer 2, and prevents the first sealing element 6 from cracking or even falling off from a side of the electrochromic layer 3.

In some embodiments as shown in FIG. 7, a surface of the second sealing part 602 facing away from the electrochromic layer 3 is located outside a surface of the first base layer 2 facing away from the electrochromic layer 3. Therefore, part of the second sealing part 602 is embedded in the first base layer 2, thereby improving the connection stability of the first sealing element 6 to the first base layer 2 and reducing the probability of cracking or even falling off of the first sealing element 6 from a side of the electrochromic layer 3. In an example, the first additional layer 1 is attached to the first base layer 2 and is located inside the second sealing part 602, and a surface of the first additional layer 1 away from the first base layer 2 is flush with a surface of the second sealing part 602 facing away from the electrochromic layer 3. In this manner, not only the water and oxygen barrier performance of the entire electrochromic device is improved, but also the connection stability of the first additional layer 1 to the first base layer 2 is enhanced, thereby preventing the functional layers from falling off.

In some embodiments as shown in FIG. 8, a surface of the second sealing part 602 facing away from the electrochromic layer 3 is flush with a surface of the first base layer 2 facing away from the electrochromic layer 3. In this manner, the periphery of the first base layer 2 is completely wrapped in the first sealing element 6, which improves the connection stability of the first base layer 2 to the first sealing element 6, of the electrochromic layer 3 to the first base layer 2 and the second base layer 4, thereby improving the serviceability of the entire electrochromic device. In this manner, the first additional layer 1 is disposed on a surface of the first base layer 2 facing away from the electrochromic layer 3 and the outer periphery of the first additional layer 1 is flush with the outer periphery of the first sealing element 6. The first additional layer 1 can be a functional layer such as a water-oxygen barrier layer. The surface of the second sealing part 602 facing away from the electrochromic layer 3 is flush with the surface of the first base layer 2, which facilitates the adhesion of the first additional layer 1. The adhesion between the second sealing part 602 and the first additional layer 1 is better than that between the first base layer 2 and the first additional layer 1 so that the connection stability of the first additional layer 1 can be improved, thereby preventing the first additional layer 1 from falling off.

In some embodiments as shown in FIG. 9, the width of the first sealing part 601 is D1 which satisfies the relationship: 0.1 mm≤D1≤50 mm. For example, the width may be 0.1 mm, 0.2 mm, 0.3 mm, 0.4 mm, 0.5 mm, 1.0 mm, 2 mm, 5 mm, 10 mm, 20 mm, 30 mm, 40 mm, 50 mm, and so on. Since the second additional layer 5 and the second base layer 4 are generally transparent layers, and the length of the second base layer 4 in the embodiment of the present application is greater than that of the electrochromic layer 3, when the electrochromic layer 3 is discolored, the outer edge of the entire electrochromic layer 3 has a part of color-invariant region which is directly opposite to the first sealing part 601. The larger the width of the first sealing part 601 is, the larger color-invariant region is, and the larger a blocking layer 14 needs to be disposed on the second additional layer 5 for the entire electrochromic device. In other words, the larger the width of the first sealing part 601 is, the larger the color-invariant size of the electrochromic device is; the smaller the width of the first sealing part 601 is, the weaker the strength of the first sealing part 601 is, which means that the first sealing part 601 is more easily damaged. At the same time, the smaller the width of the first sealing part 601 is, the easier it is for water vapor and oxygen to penetrate the first sealing part 601 and enter from a side of the electrochromic layer 3, thereby affecting the stability of the electrochromic layer 3. However, in the embodiment of the present application, the width of the first sealing part 601 is controlled between 0.1 mm and 50 mm, so as to reduce the color-invariant size of the electrochromic device while ensure the strength and sealing performance of the first sealing part 601. In this manner, the market competitiveness of the electrochromic device is enhanced.

In some embodiments as shown in FIG. 9, the width of the second sealing element 7 is D2, and D1 and D2 satisfy the relationship: $\frac{1}{10} \leq D2/D1 \leq \frac{9}{10}$. When the width of the second sealing element 7 is too large or too small, the second sealing element 7 is not easily formed. In the embodiment of the present application, the aperture of the second sealing element 7 is controlled between $\frac{1}{10}$ and $\frac{9}{10}$ of the width of the first sealing part 601 for the convenience of manufacturing the second sealing element 7.

The width of the second sealing element 7 is the dimension of the second sealing element 7 in the width direction of the first sealing part 601. When the vertical section of the second sealing element 7 is a rectangle, the width of the second sealing element 7 is the length of the side of the vertical section of the second sealing element 7 in the width direction of the first sealing part 601, and when the vertical section of the second sealing element 7 is a circle or an oval, the width of the second sealing element 7 is the diameter of the circle or the length of the major or minor axis of the oval.

In some embodiments as shown in FIG. 9, one end of the second sealing element 7 is inserted into the first sealing part 601 where the length of insertion is H1, the length of the first sealing part 601 is H2, and 0≤H1≤H2. In an example, H1 satisfies the relationship: $\frac{1}{5} \leq H1/H2 \leq \frac{4}{5}$. The shorter the length of the insertion is, the smaller the interaction between the first sealing part 601 and the second sealing element 7 is, and the connection of the first sealing part 601 to the second sealing element 7 is less stable. While the longer the length of the insertion is, the greater the depth of the groove formed to accommodate the second sealing element 7 after etching the first sealing part 601 during manufacturing is, the more difficult it is to clean the residual material in the groove, and the more waste of the first sealing part 601 is caused, which does not help to control the cost of the electrochromic device. In an example of the present application, the length of the second sealing element 7 inserting into the first sealing part 601 is controlled between $\frac{1}{5}$H2 and $\frac{4}{5}$H2, so as to ensure the connection stability of the first sealing part 601 to the second sealing element 7, reduce the removal amount and the waste of the first sealing part 601, and facilitate the manufacturing of the second sealing element 7.

In some embodiments as shown in FIG. 10, the width of the second sealing part 602 is D3, and D1 and D3 satisfy the relationship: 1<D3/D1≤10. D3/D1 may be, for example, 2, 3, 4, 5, 6, 7, 8, 9, or 10, and so on. Within the above range, the second sealing part 602 can better ensure the structural stability of the sealing element. In other embodiments of the present application, the ratio of D3 to D1 may be selected according to actual needs, and is not limited to the above description.

In some embodiments as shown in FIG. 10, the height of the second sealing part 602 is H3, and H3 satisfies the relationship: 0.1 mm<H3≤100 mm, which may be, for example, 0.2 mm, 0.3 mm, 0.4 mm, 0.5 mm, 1.0 mm, 2 mm, 5 mm, 10 mm, 20 mm, 30 mm, 40 mm, 50 mm, and 100 mm, and so on. Within the above range, the second sealing part 602 can better ensure the structural stability of the sealing element.

In an exemplary embodiment, materials of the first sealing element 6 and the second sealing element 7 include any one of adhesives conventional in the art with insulating and water-oxygen barrier effects, such as pressure-sensitive adhesive, hot melt adhesive, UV light-curing adhesive, heat-curing adhesive and UV thermal dual-curing adhesive.

In some embodiments as shown in FIG. 11, the electrochromic device further includes a removable first external protective layer 10 disposed on an outer side of the first additional layer 1. The first sealing part 601 is embedded in the first additional layer 1 and the first adhesive layer 8, the surface of the second sealing part 602 facing the electrochromic layer 3 abuts on a surface or inside of the first additional layer 1, the first adhesive layer 8 or the first base layer 2, and the surface of the second sealing part 602 facing away from the electrochromic layer 3 is flush with a surface of the first external protective layer 10. Therefore, in the process of shipping, the first external protective layer 10 is covered on the first additional layer 1, which ensures the water-oxygen barrier performance of the entire electrochromic device and prevents the first additional layer 1 from being scratched, thereby reducing the transport loss of electrochromic devices.

In an exemplary embodiment, the first external protective layer 10 may be in short, a layer structure with poor adhesion and easy peeling, such as a release film. In this manner, it only needs to remove the first external protective layer 10 from the first base layer 2 in practical use. At the same time, increasing the thickness of the first external protective layer 10 adds to the thickness of the second sealing part 602 under the condition that the overall thickness of the electrochromic device remains basically unchanged, so as to ensure the water vapor barrier performance of the electrochromic device.

In some embodiments as shown in FIGS. 12 to 15, the electrochromic device further includes a decorative layer 11 or a reflective layer 12, which are located at a surface of the first additional layer 1 facing away from the first base layer 2. The decorative layer 11 may be a decorative film layer with a certain pattern, color, and the like. The reflective layer 12 may be a metal reflective coating, such as a silver reflective coating, a tin reflective coating, and an aluminum reflective coating. When the electrochromic device of the embodiment of the present application is applied to scenarios such as a rearview mirror of a car and a glass outer wall, additional layers need to be added to meet actual needs. In the present embodiment, the outer side of the first additional layer 1 may as well be provided with the decorative layer 11 and the reflective layer 12, so that layers attached to the outer side of the first additional layer 1 may be selected according to actual needs in practical use. Therefore, the application scope of the electrochromic device of this embodiment is wider, and the market competitiveness of the product is improved.

In some embodiments of the present application, the decorative layer 11 or the reflective layer 12 may also be provided between the first additional layer 1 and the first base layer 2.

In an embodiment, the connection between the decorative layer 11 and the first base layer 2 or the first additional layer 1, and the connection between the reflective layer 12 and the first base layer 2 or the first additional layer 1 may be bonded or evaporated. The specific connection method may be selected according to actual needs, and the connection between the decorative layer 11 and the first base layer 2 or the first additional layer 1, and the connection between the reflective layer 12 and the first base layer 2 or the first additional layer 1 are not limited herein.

Figure 14:
FIG. 14 is a diagram illustrating the structure of an electrochromic device according to an embodiment of the present application.

In some optional embodiments as shown in FIG. 14, the electrochromic device further includes a second external protective layer 13 located on a side of the decorative layer 11 or the reflective layer 12 facing away from the first additional layer 1. The second external protective layer 13 may be a material with certain hardness, such as hard plastic and glass. In practical use, if the decorative layer 11, the reflective layer 12 and the first additional layer 1 are all flexible layers, easy scratching or damage may occur in some special application scenarios. An additional second external protective layer 13 outside a side of the decorative layer 11 or the reflective layer 12 can not only improve the water and oxygen barrier capability of the electrochromic device and ensure the serviceability of the electrochromic layer 3, but also protect the decorative layer 11, the reflective layer 12 and the first additional layer 1, thereby reducing the probability of damage of the electrochromic device and prolonging the service life of the entire electrochromic device.

In an embodiment, the connection of the second external protective layer 13 to the decorative layer 11 or the reflective layer 12 may be made by bonding. The specific connection method may be selected according to actual needs, and the connection of the second external protective layer 13 to the decorative layer 11 or the reflective layer 12 is not limited herein.

Figure 15:
FIG. 15 is a diagram illustrating the structure of an electrochromic device according to an embodiment of the present application.

In some optional embodiments as shown in FIGS. 14 and 15, the electrochromic device further includes a blocking layer 14 sandwiched between the second base layer 4 and the second additional layer 5. The blocking layer 14 is annular. The projection of the first sealing element 6 on the second additional layer 5 falls within the projection range of the blocking layer 14 on the second additional layer 5. Since the second additional layer 5 and the second base layer 4 are generally transparent layers, when the length of the second base layer 4 is greater than that of the electrochromic layer 3 and when the electrochromic layer 3 is discolored, the outer edge of the entire electrochromic layer 3 has a part of color-invariant region showing the color of the first sealing element 6, which reduces the aesthetics of the entire electrochromic layer 3. In the embodiment of the present application, the additional blocking layer 14 can better shield the color-invariant part of the electrochromic element, thereby improving the aesthetics of the electrochromic device.

Figure 16:
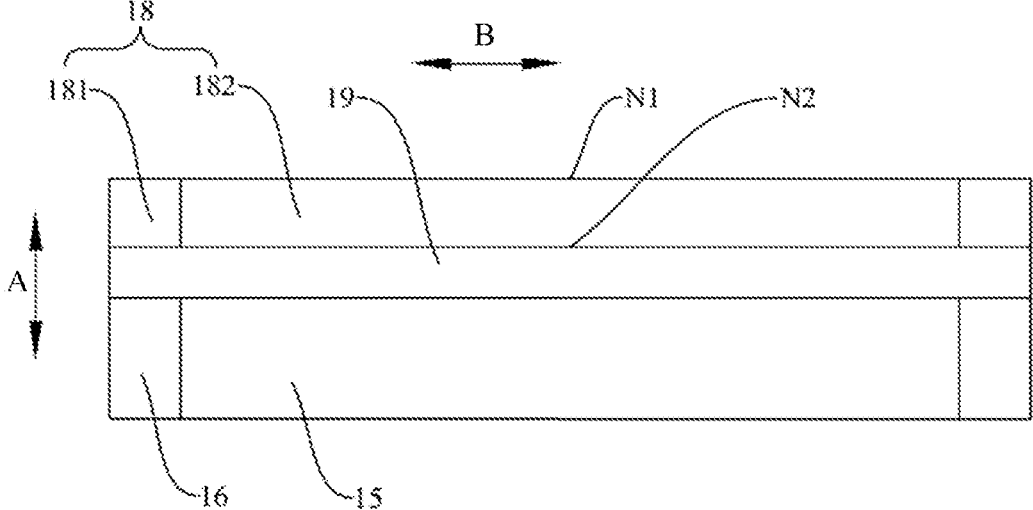
FIG. 16 is a diagram illustrating the structure of an electrochromic device according to an embodiment of the present application.
Figure 17:
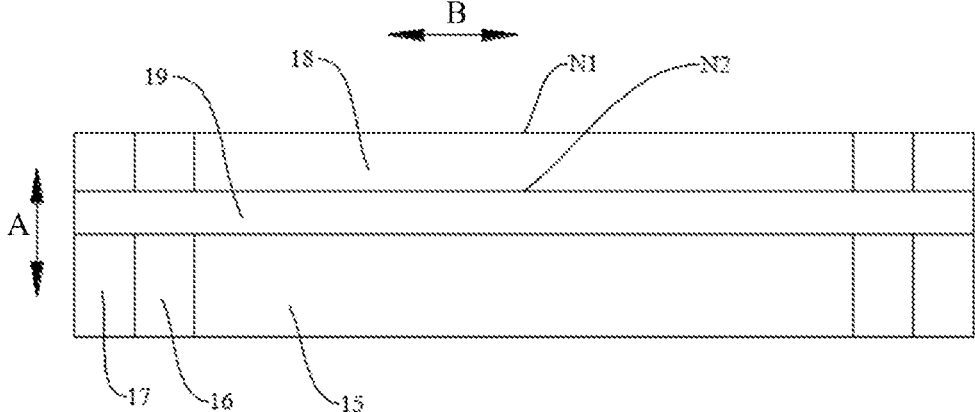
FIG. 17 is a diagram illustrating the structure of an electrochromic device according to an embodiment of the present application.
Figure 18:
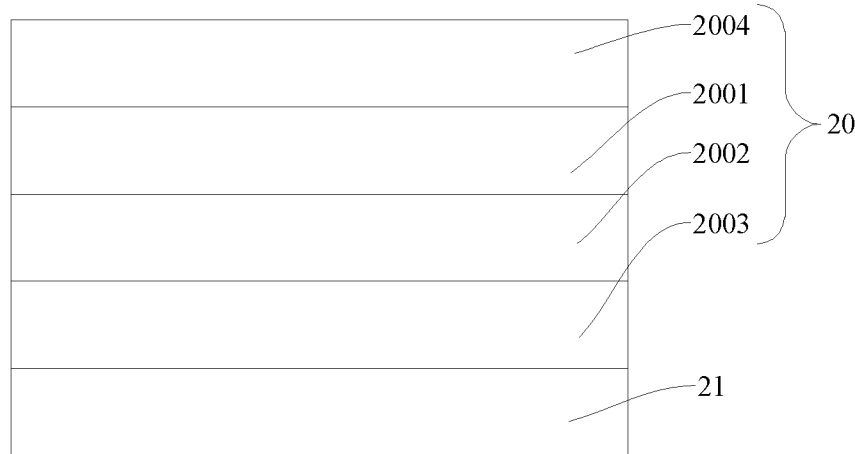
FIG. 18 is a diagram illustrating the structure of an electrochromic device according to an embodiment of the present application.
Figure 19:
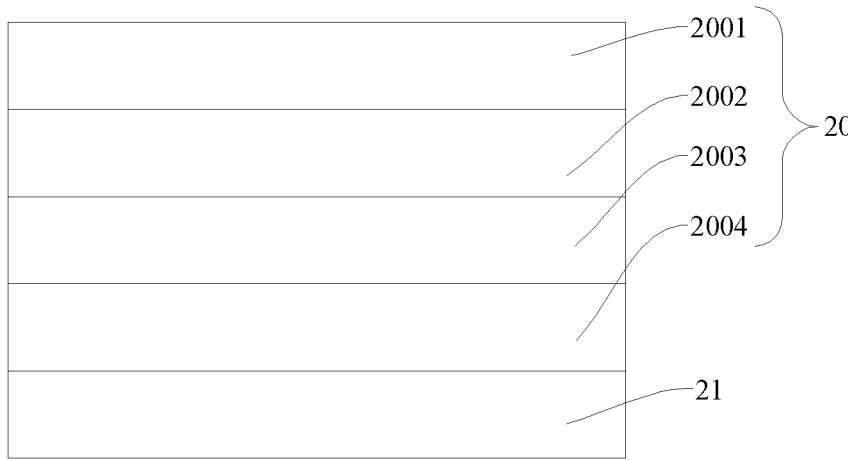
FIG. 19 is a diagram illustrating the structure of an electrochromic device according to an embodiment of the present application.
Figure 20:
FIG. 20 is a diagram illustrating the structure of an electrochromic device according to an embodiment of the present application.

In some embodiments as shown in FIGS. 16 and 17, the first additional layer 1, the first base layer 2, the electrochromic layer 3, the second base layer 4 and the second additional layer 5 constitute a body. The electrochromic device further includes a cover plate 18 disposed on at least one surface of the body. The body includes a first electrochromic region 15 and a wiring region 16, and the wiring region 16 is disposed around the first electrochromic region 15. A region of the cover plate 18 corresponding to the wiring region 16 in a first direction A is a first region 181, and a region of the cover plate 18 corresponding to the first electrochromic region 15 in the first direction A is a second region 182. A surface roughness within the first region 181 is ≥0.6 μm, and the surface roughness within the second region 182 is <0.6 μm.

When the cover plate 18 is disposed on a surface of the body parallel to a second direction B, a region of the cover plate 18 corresponding to the wiring region 16 in the first direction A is a first region 181 and a surface roughness within the first region 181 is ≥0.6 μm, the first region 181 is low in gloss, high in haze and low in transmittance, so that the wiring region 16 can be effectively blocked, the difference in appearance between a structure of the wiring region 16 surrounding the electrochromic device and the first electrochromic region 15 can be reduced, and light reflection, glare and the like are not likely to be produced, so as to improve the uniformity of the appearance and the aesthetics.

In some embodiments, the cover plate 18 includes a first surface N1 and a second surface N2 disposed opposite to each other, and the first surface N1 is disposed on the side facing away from the body. The surface roughness of the cover plate 18 within the first region 181 is the surface roughness of the first surface N1 of the cover plate 18 within the first region 181, and the surface roughness of the cover plate 18 within the second region 182 is the surface roughness of the first surface N1 of the cover plate 18 within the second region 182.

In an embodiment, the first surface N1 is disposed on the side facing away from the body, and the second surface N2 is disposed on the side adjacent to the body. The surface roughness of the cover plate 18 within the first region 181 is the surface roughness of the first surface N1 of the cover plate 18 within the first region 181, which means that the surface roughness of the cover plate 18 within the first region 181 is the surface roughness of the cover plate 18 facing outside. Compared with the surface roughness of the cover plate 18 facing inside, the surface roughness of the cover plate 18 within the first region 181 of the embodiment of the present application makes the surface low in gloss, high in haze and low in transmittance, so that the effect of shielding the wiring region 16 is better.

In some embodiments, a surface roughness of the cover plate 18 within the first region 181 gradually decreases in a direction from the first region 181 to the second region 182. Setting the surface roughness of the cover plate 18 within the first region 181 to gradually decreases makes it more natural to transit the surface of the cover plate 18 of the first region 181 corresponding to the wiring region 16, easier for the surface of the cover plate 18 within the first region 181 to connect to the surface of the cover plate 18 within the second region 182 corresponding to the first electrochromic region 15 which requires high transmittance and low roughness, and conducive to reducing appearance difference between the structure for shielding the wiring region 16 around the electrochromic device and the first electrochromic region 15. Therefore, the overall aesthetics is improved.

In an exemplary embodiment, within a region located in the second region 182 and at a distance of less than a preset width from a periphery of the second region 182, a surface roughness of the cover plate 18 gradually decreases in a direction from the periphery of the second region 182 to a center of the second region 182. Exemplarily, the preset width is within a range of one tenth to one sixtieth of the maximum width of the second region 182. Within a region located in the second region 182 and at a distance of less than a preset width from the periphery of the second region 182, the surface roughness of the cover plate 18 gradually decreases, which echoes and corresponds to the gradually decreasing surface roughness of the cover plate 18 in the first region 181, so that the surface transition of the cover plate 18 is more natural. In this manner, the overall aesthetics can be ensured, and the shielding effect of the first region 181 and the light transmission effect of the second region 182 can be satisfied.

In an exemplary embodiment, within a region located in the second region 182 and at a distance greater than or equal to the preset width from the periphery of the second region 182, the surface roughness of the cover plate 18 is uniform. Exemplarily, the preset width is within a range of one tenth to one sixtieth of the maximum width of the second region 182. The region located in the second region 182 and at the distance greater than or equal to the preset width from the periphery of the second region 182 is a central region of the first electrochromic region 15 corresponding to the cover plate 18. Within the region, configuring the surface roughness of the cover plate 18 to be uniform makes it easier for the color rendering of the central region of the first electrochromic region 15, and at the same time, makes it convenient for processing, and meets the aesthetics needs.

In some embodiments, the cover plate 18 is disposed on both opposing surfaces of the body, which can meet the needs of shielding the wiring region 16 on opposite surfaces of some terminal devices and the color rendering effect of the two opposite surfaces of the first electrochromic region 15.

In an exemplary embodiment, the surface roughness of the cover plate 18 within the first region 181 is greater than that of the cover plate 18 within the second region 182. Since the surface roughness of the cover plate 18 within the first region 181 is greater than that of the cover plate 18 within the second region 182, and given the fact that higher surface roughness comes with lower surface glossiness, higher haze, and lower transmittances, the following conclusions can be drawn: the surface roughness of the cover plate 18 within the first region 181 is higher than that of the cover plate 18 within the second region 182, so the transmittance is lower, which can effectively satisfy the needs for shielding the wiring region 16; the surface roughness of the cover plate 18 within the second region 182 is lower than that of the cover plate 18 within the first region 181, so the transmittance is higher, which can effectively facilitate color rendering effect of the first electrochromic region 15. In an embodiment, the surface roughness of the cover plate 18 within the second region 182 is <0.6 μm, which does not affect the color rendering effect of the first electrochromic region 15, and within a region located in the second region 182 and at a distance less than the preset width from the periphery of the second region 182, the second region 182 can be connected with the first region 181, which enables natural surface transition in line with aesthetic needs.

In some embodiments as shown in FIG. 17, the body further includes a second electrochromic region 17 disposed around the wiring region 16. A region of the cover plate 18 corresponding to the second electrochromic region 17 in a first direction A is a third region, and the surface roughness of the cover plate 18 in the third region is configured to be equal to that of the cover plate 18 in the first region 181.

Configuring the surface roughness of the cover plate 18 in the third region to be equal to that of the cover plate 18 in the first region 181 does not affect the color rendering effect of the entire electrochromic device, but rather facilitate processing in line with aesthetic needs.

In an exemplary embodiment, as shown in FIGS. 16 and 17, the cover plate 18 and the body are bonded by a third adhesive layer 19. By providing the third adhesive layer 19, the cover plate 18 can be effectively bonded to an end surface of the body. With good firmness and reliability, the cover plate 18 does not easily loosen or even fall off from the end surface of the body. Importantly, since the third adhesive layer 19 is transparent, the color rendering effect of the first electrochromic region 15 of the body in the electrochromic region is not affected.

In an exemplary embodiment, the cover plate 18 is glass. Adopting glass for the cover plate 18 brings higher transmittance of the second region 182 of the cover plate 18, which helps facilitate color rendering effect of the electrochromic device at low costs, and the surface roughness value of the cover plate 18 can be adjusted to regulate its surface transmittance. In other embodiments of the present application, the cover plate 18 is not limited to glass, and other transparent materials may also be selected according to specific conditions.

In some embodiments as shown in FIGS. 18 to 21, at least one of the first base layer 2 and the second base layer 4 includes a conductive multilayer structure 20 and a base substrate layer 21 stacked in sequence. The conductive multilayer structure 20 disposed on a surface of the electrochromic layer 3 includes a base protective layer 2001, a base conductive layer 2002 and an underlayer 2003 stacked in sequence. The base protective layer 2001 is disposed on a surface adjacent to the electrochromic layer 3. The conductive multilayer structure 20 further includes a barrier layer 2004 disposed at at least one of the following positions: between the electrochromic layer 3 and the base protective layer 2001, between the underlayer 2003 and the base substrate layer 21, and on a surface of the base substrate layer 21 facing away from the electrochromic layer 3.

The base substrate layer 21 of the embodiment of the present application is equivalent to the first substrate layer 201 of the first base layer 2 or the second substrate layer 401 of the second base layer 4 described above. Since structures of the first base layer 2 and the second base layer 4 are similar in the embodiment of the present application, the first substrate layer 201 and the second substrate layer 401 are collectively referred to as the base substrate layer 21 for the convenience of the following description.

The conductive multilayer structure 20 includes a base protective layer 2001, a base conductive layer 2002 and an underlayer 2003 stacked in sequence. The base protective layer 2001 can protect the base conductive layer 2002 from being oxidized during the manufacturing of the electrochromic device. The underlayer 2003 is configured to increase the adhesion between the base conductive layer 2002 and the base substrate layer 21 or the adhesion between the base conductive layer 2002 and the barrier layer 2004. In addition, the barrier layer 2004 disposed between the electrochromic layer 3 and the base protective layer 2001, between the underlayer 2003 and the base substrate layer 21, or on the surface of the base substrate layer 21 facing away from the electrochromic layer 3, which can effectively improve the water and oxygen barrier effect on a surface of the base substrate layer 21 and enhance the electrochemical stability of the electrochromic device. In addition, on the basis that the electrochromic layer 3 has variable optical properties such as color and transmittance, the underlayer 2003, the barrier layer 2004 and the base protective layer 2001 have different refractive indices and transmittances due to their non-uniform materials and thicknesses. Therefore, the refractive index and transmittance of the electrochromic device may be adjusted by the multilayer combination of the underlayer 2003, the barrier layer 2004 and the base protective layer 2001, so as to enable the electrochromic device to present a rich and colorful visual effect.

In an exemplary embodiment, materials of the base substrate layer 21 may be glass, plastic, or the like. Plastic substrate materials include, but are not limited to, any one or a combination of at least two of polyethylene terephthalate (PET), cyclic olefin copolymer and cellulose triacetate. Optional but non-limiting combinations include a combination of PET and cyclic olefin copolymer, a combination of cyclic olefin copolymer and cellulose triacetate, a combination of PET and cellulose triacetate or a combination of PET, cyclic olefin copolymer and cellulose triacetate. In an example, the thickness of the plastic substrate material ranges from 20 μm to 500 μm, for example, the thickness of the plastic substrate material may be 20 μm, 50 μm, 100 μm, 150 μm, 200 μm, 250 μm, 300 μm, 350 μm, 400 μm, 450 μm or 500 μm, but is not limited to the values listed above. Other values within the numerical range but not listed above are also applicable. When the material of the base substrate layer 21 is glass, the thickness of the base substrate layer 21 is not excessively limited, and those skilled in the art may make reasonable selections according to actual applications.

In an exemplary embodiment, the electrochromic layer 3 is a layer with adjustable transmittance composed of one or more layers of materials in a gel state or a solid state, such as Polymer Dispersed Liquid Crystal (Polymer Dispersed Liquid Crystal, PDLC) layer, Suspended Particle Device (Suspended Particle Device, SPD) layer and Electrochromic (Electrochromic, EC) layers. For an electrochromic layer 3 of the Electrochromic (EC) type, it may include an electrochromic material layer 301, an electrolyte layer 302 and an ion storage layer 303 stacked in sequence. The electrochromic material layer 301, the electrolyte layer 302 and the ion storage layer 303 may adopt a material in the related art, which is not specifically limited by the present application.

In some embodiments, a surface of the barrier layer 2004 facing away from the base substrate layer 21 is a concave-convex textured surface. Since the texture directions of the concave-convex textured surface and the distances between adjacent textures are different, the concave-convex textured surface causes light passing through the barrier layer to be refracted or reflected in a preset direction or in multiple different directions. On the basis of variable light properties of the electrochromic layer 3 and the ability of the multilayer combination of the underlayer 2003, the barrier layer 2004 and the base protective layer 2001 to adjust the transmittance and refractive index, configuring a side of the barrier layer 2004 facing away from the base substrate layer 21 to be a concave-convex textured surface can further enable the electrochromic device to present a richer and more colourful visual effect.

In an embodiment, a surface of the barrier layer 2004 facing away from the base substrate layer 21 may be configured as a concave-convex textured surface by means of a process method. When the barrier layer 2004 is sprayed on the base substrate layer 21, the thickness of a surface of the barrier layer 2004 can be controlled by the amount of spraying, so that the effect of high local deposition and low local deposition can be achieved, thereby forming a concave-convex textured surface. The concave-convex textured surface may also be processed by other methods, and is not limited to the above-mentioned process.

Figure 21:
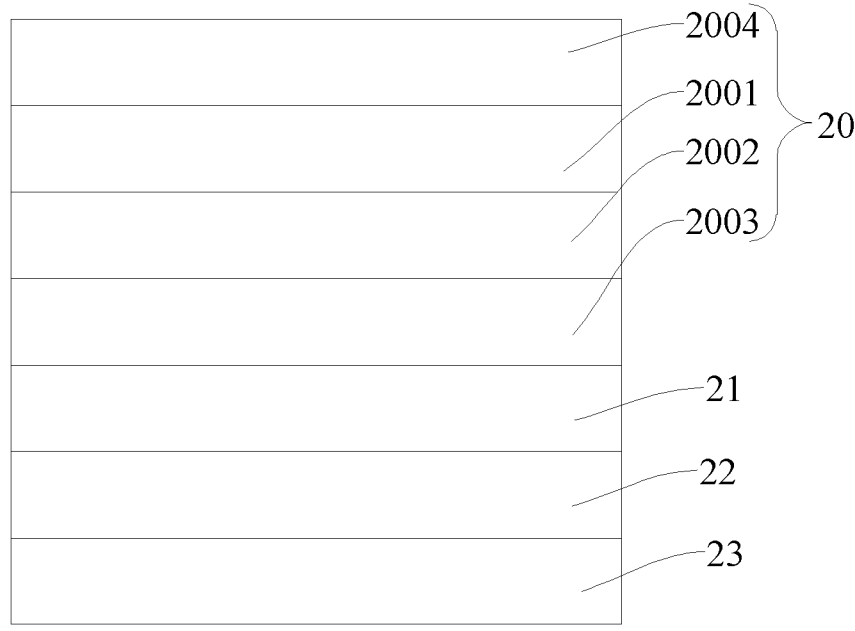
FIG. 21 is a diagram illustrating the structure of an electrochromic device according to an embodiment of the present application.

In some embodiments as shown in FIG. 21, the conductive multilayer structure 20 further includes at least one of an ink layer 22 and a color layer 23, and at least one of the ink layer 22 and the color layer 23 is disposed on the surface of the base substrate layer 21 facing away from the electrochromic layer 3. Exemplarily, the ink layer 22 and the color layer 23 each may be disposed on the surface of the base substrate layer 21 facing away from the electrochromic layer 3 and the ink layer 22 and the color layer 23 may also be superimposed and disposed on the base substrate layer 21 facing away from the electrochromic layer 3. At least one of the ink layer 22 and the color layer 23 is used for color matching. Personalized color matching, such as single color or gradient color may be performed according to product needs.

In an exemplary embodiment, the surface of the color layer 23 facing away from the base substrate layer 21 is a concave-convex textured surface. The same is true for the surface of the barrier layer 2004 facing away from the base material layer 21 being a concave-convex textured surface. Since the texture directions of the concave-convex textured surface and the distances between adjacent textures are different, the concave-convex textured surface causes light passing through the color layer to be refracted or reflected in a preset direction or in multiple different directions. On the basis of variable light properties of the electrochromic layer 3 and the ability of the multilayer combination of the underlayer 2003, the barrier layer 2004 and the base protective layer 2001 to adjust the transmittance and refractive index, configuring a surface of the color layer 23 facing away from the base substrate layer 21 to be a concave-convex textured surface can further enable the electrochromic device to present a richer and more colourful visual effect.

In an embodiment, a surface of the color layer 23 facing away from the base substrate layer 21 may be configured as a concave-convex textured surface by means of a process method. When the color layer 23 is sprayed on the base substrate layer 21, the thickness of a surface of the color layer 23 may be controlled by the amount of spraying, so that the effect of high local deposition and low local deposition can be achieved, thereby forming a concave-convex textured surface.

In some embodiments, the base protective layer 2001 is a monolayer or multilayer structure formed by a layer or layers selected from a nickel-chromium alloy layer, a silicon nitride layer, an aluminum nitride layer and a titanium nitride layer, which can effectively protect the base conductive layer 2002 from being oxidized in the manufacturing process. The thickness of the base protective layer 2001 is usually relatively thin, and its thickness is within a range of 1 nm to 10 nm.

In some embodiments, the underlayer 2003 is a monolayer or multilayer structure formed by a layer or layers selected from a silicon nitride layer, a silicon oxide layer and a nickel-chromium alloy layer, so that the adhesion between the base conductive layer 2002 and the base substrate layer 21 or the adhesion between the base conductive layer 2002 and the barrier layer 2004 can be effectively increased. The thickness of the underlayer 2003 is within a range of 10 nm to 20 nm.

In some embodiments, the barrier layer 2004 is a monolayer or multilayer structure formed by a layer or layers selected from a silicon dioxide layer, a silicon nitride layer, a niobium oxide layer, a titanium oxide layer, an aluminum oxide layer, or an indium tin zinc oxide layer, so that water and oxygen barrier effect is achieved. In an example, the barrier layer 2004 is a double-layer or multilayer structure formed by an aluminum oxide layer and an indium tin zinc oxide layer, so that excellent water and oxygen barrier effect is achieved. The thickness of the barrier layer 2004 is within a range of 80 nm to 800 nm, for example, 80 nm to 300 nm.

In some embodiments, the base conductive layer 2002 is a monolayer or multilayer structure formed by a layer or layers selected from a silver layer, a silver alloy layer, an indium tin oxide (ITO) layer or an aluminum zinc oxide (AZO) layer, which enables the base conductive layer to have a good electrical conductivity and low resistivity, thereby helping to reduce the surface resistance of at least one of the base layer 2 and the second base layer 4 and accelerate the discoloration speed of the electrochromic layer 3. The thickness of the base conductive layer 2002 may be within a range of 20 nm to 200 nm, for example, 40 nm to 70 nm.

In some embodiments, the electrochromic device includes a third adhesive layer 19 cladded on the outermost layer of the electrochromic device, and a surface of the third adhesive layer 19 facing away from the outermost layer is provided with a removable release film. The third adhesive layer 19 can adopt any one or a combination of at least two of PolyVinyl Butyral (PolyVinyl Butyral, PVB), Ethylene-vinyl Acetate Copolymer (Ethylene-vinyl Acetate Copolymer, EVA), OCA Optically Clear Adhesive (Optically Clear Adhesive), SCA optically clear adhesive, ionoplast interlayer (Sentry Glas Plus, SGP), Liquid Optical Clear Adhesive (LOCA) or acrylic. The outermost layer of the electrochromic device is encapsulated with the third adhesive layer 19 and a detachable release film is disposed on a surface of the third adhesive layer 19 facing away from the outermost layer. Attachment can be made by removing the release film in practical use.

In the embodiment of the present application, the third adhesive layer 19 is equivalent to the first adhesive layer 8 or the second adhesive layer 9 described above. Since it is not necessary to distinguish the first base layer 2 and the second base layer 4 in the present embodiment, the third adhesive layer 19 is used to refer to at least one of the first adhesive layer 8 and the second adhesive layer 9 for the convenience of description.

In an exemplary embodiment, the length or width of the third adhesive layer 19 may be slightly greater than the length or width of the electrochromic device. Knead up and down ends of the third adhesive layer 19 located on both the upper and lower sides of the electrochromic device, so that the electrochromic device is wrapped in the third adhesive layer 19 to further prevent intrusion of water vapor from sides of the electrochromic device. The sides of a periphery of the electrochromic device can also be first sealed by glue, so as to further improve the water and oxygen barrier effect of the electrochromic device.

In some embodiments as shown in FIGS. 22 to 27, the first base layer 2 includes a first transparent conductive layer 202 and a first substrate layer 201 stacked in sequence and the first transparent conductive layer 202 adheres to a first side of the electrochromic layer 3. The second base layer 4 includes a second transparent conductive layer 402 and a second substrate layer 401 stacked in sequence, and the second transparent conductive layer 402 adheres to a second side of the electrochromic layer 3. A partition groove 24 is formed in the second transparent conductive layer 402 so that the second transparent conductive layer 402 is divided into a first conductive region 4021 and a second conductive region 4022 which are independent of each other. At least part of the electrochromic layer 3 corresponding to the second conductive region 4022 is removed to form a conductive via 25, a conductive member 26 is poured into the conductive via 25, and the conductive member 26 is configured to electrically connect the first transparent conductive layer 202 and the second conductive region 4022.

In manufacturing process, the second transparent conductive layer 402 is first etched to form a partition groove 24 so that the second transparent conductive layer 402 is divided into the first conductive region 4021 and the second conductive region 4022 which are independent of each other. At least part of the electrochromic layer 3 corresponding to the second conductive region 4022 is removed to form the conductive via 25, a liquid conductive member 26 is poured into the conductive via 25, and the conductive member 26 is respectively connected to the first transparent conductive layer 202 and the second conductive region 4022 located at the conductive via 25 when the liquid conductive member 26 is changed into a solid conductive member 26, so as to electrically connect the first transparent conductive layer 202 and the second conductive region 4022. In this manner, the electrochromic device can achieve the same-side electrode extraction. Therefore, an electrode lead used for connecting the first transparent conductive layer 202 and an electrode lead used for connecting the second transparent conductive layer 402 can both be drawn out from the second base layer 4, so that welding of the two electrode leads of the electrochromic device can be completed by one thermal pressure welding. The process is simple, which helps to realize automatic production and improve work efficiency and product yield.

In an exemplary embodiment, materials of the first substrate layer 201 and the second substrate layer 401 may be glass, plastic, or the like. Plastic substrate materials include, but are not limited to, any one or a combination of at least two of polyethylene terephthalate (PET), cyclic olefin copolymer and cellulose triacetate. Optional but non-limiting combinations include a combination of PET and cyclic olefin copolymer, a combination of cyclic olefin copolymer and cellulose triacetate, a combination of PET and cellulose triacetate or a combination of PET, cyclic olefin copolymer and cellulose triacetate. In an example, thickness of the plastic substrate material range from 20 μm to 500 μm, such as 20 μm, 50 μm, 100 μm, 150 μm, 200 μm, 250 μm, 300 μm, 350 μm, 400 μm, 450 μm and 500 μm, but not limited to the values listed above. Other values within the numerical range but not listed above are also applicable. When the material of the first substrate layer 201 and the second substrate layer 401 is glass, the thickness of the base material layer is not excessively limited, and those skilled in the art may make reasonable selections according to actual applications.

In an exemplary embodiment, materials of the first transparent conductive layer 202 and the second transparent conductive layer 402 include, but are not limited to any one or a combination of at least two of indium tin oxide (ITO), aluminum zinc oxide (AZO), fluorine doped tin oxide (FTO), silver nanowire, graphene, carbon nanotube, metal mesh, and silver nanoparticle. Optional but non-limiting combinations include a combination of ITO and AZO, a combination of AZO and FTO, a combination of nanosilver wire and graphene, a combination of graphene and carbon nanotube, a combination of carbon nanotube and metal mesh, a combination of metal mesh and silver nanoparticle, a combination of nanosilver wire and silver nanoparticle, a combination of ITO, AZO and nanometer, a combination of silver nanowire, graphene and carbon nanotube, a combination of graphene, carbon nanotube, metal mesh and silver nanoparticle or a combination of ITO, AZO, FTO, silver nanowire, graphene, carbon nanoparticle, metal mesh and silver nanoparticle. The thickness of the conductive layer is within a range of 0.1 nm to 10 μm, for example, 0.1 nm, 0.5 nm, 1 nm, 5 nm, 10 nm, 100 nm, 500 nm, 1 μm, 3 μm, 5 μm, 7 μm and 10 μm, but is not limited to the listed values. Other values within the range are also applicable. In an example, the thickness of the conductive layer may be within a range of 0.1 nm to 1 μm.

In an exemplary embodiment, the conducting member 26 adopts a material with high electrical conductivity, such as silver paste. In other embodiments, the conducting member 26 may be selected according to actual needs.

In some embodiments as shown in FIGS. 22 to 27, at least a surface of the first conductive region 4021 facing the partition groove 24 is covered by the electrochromic layer 3. Since the surface of the first conductive region 4021 facing the partition groove 24 is covered by the electrochromic layer 3, it can be ensured that the conductive member 26 does not contact the first conductive region 4021 after the conductive member 26 is poured into the conductive via 25, so that the first conductive region 4021 and the second conductive region 4022 are not electrically connected, thereby avoiding the short circuit of the electrochromic device.

Figure 22:
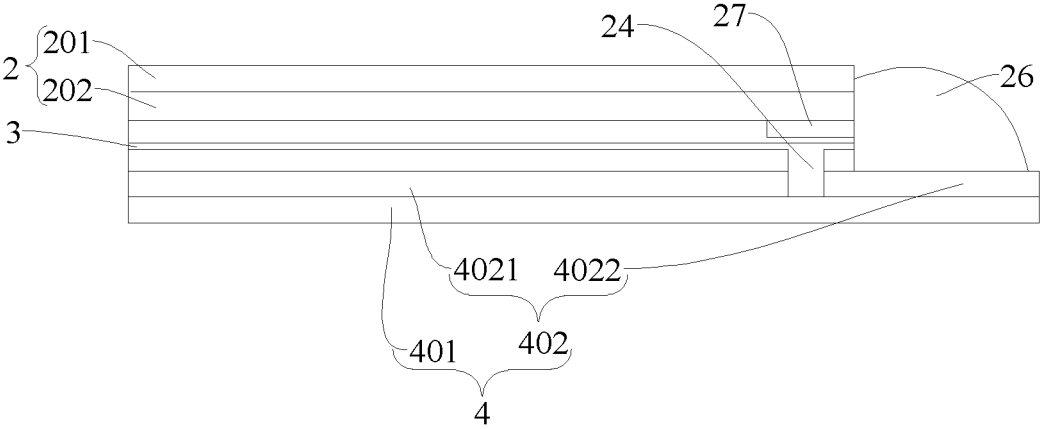
FIG. 22 is a diagram illustrating the structure of an electrochromic device according to an embodiment of the present application.
Figure 23:
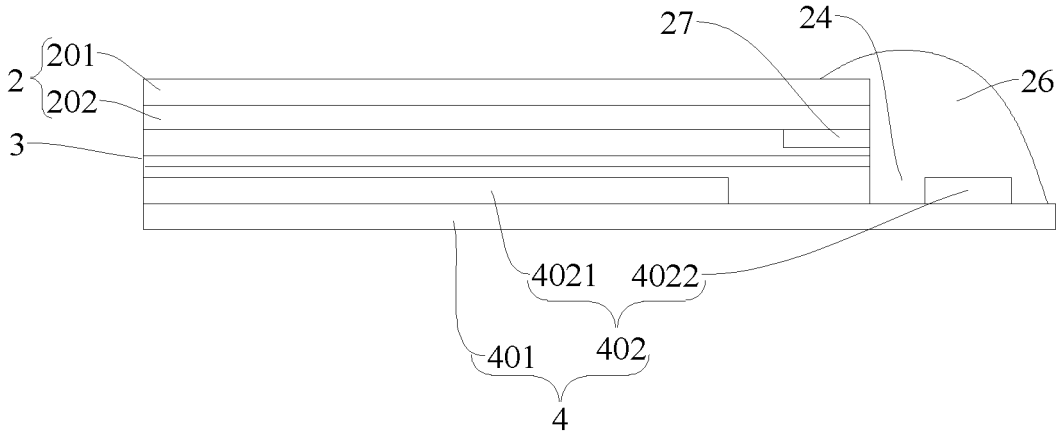
FIG. 23 is a diagram illustrating the structure of an electrochromic device according to an embodiment of the present application.
Figure 24:
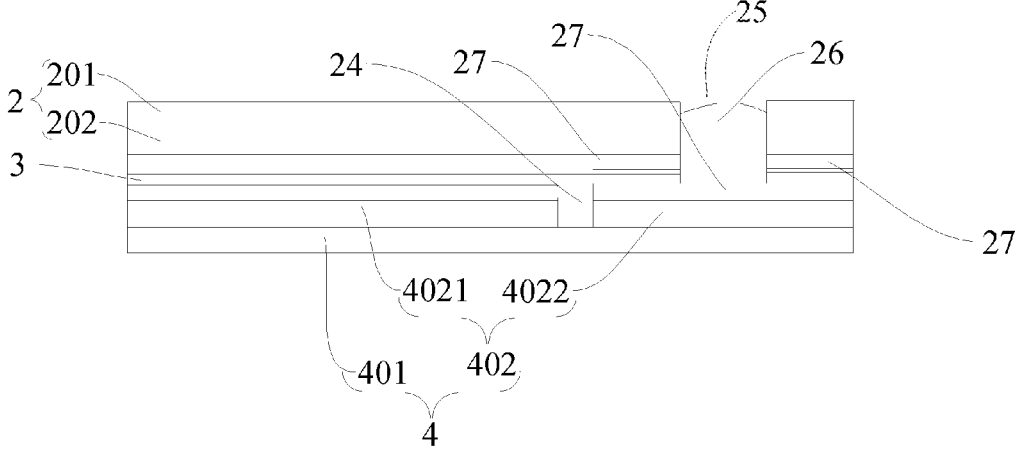
FIG. 24 is a diagram illustrating the structure of an electrochromic device according to an embodiment of the present application.
Figure 25:
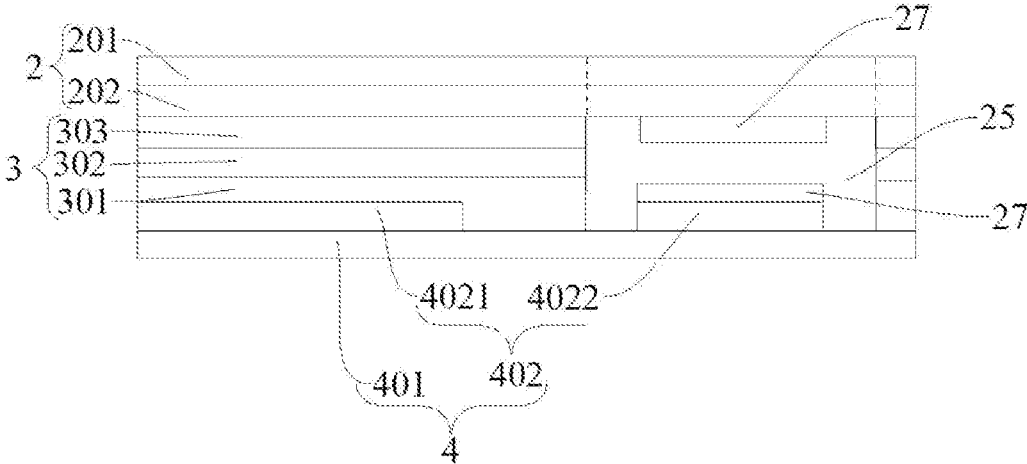
FIG. 25 is a diagram illustrating the structure of an electrochromic device according to an embodiment of the present application.

In some embodiments as shown in FIGS. 22 to 27, at least part of a surface of a periphery of the conductive member 26 is adjacent to the electrochromic layer 3. Since at least part of a surface of a periphery of the conductive member 26 is adjacent to the electrochromic layer 3, the conductive member 26 is supported and fixed, so that the reliability of the electrical connection of the first transparent conductive layer 202 to the second conductive region 4022 through the conductive member 26 is ensured. As shown in FIGS. 22 and 23, part of the surface of a periphery of the conductive member 26 is adjacent to the electrochromic layer 3, and the conductive via 25 are in an open configuration. As shown in FIGS. 24 and 25, all the surfaces of a periphery of the conductive member 26 are adjacent to the electrochromic layer 3, and the conductive via 25 is in a form of a receiving groove or a receiving cavity. When all the surfaces other than part of the surface of the periphery the conductive member 26 are adjacent to the electrochromic layer 3, the supporting effect and stability is better ensured.

In some embodiments as shown in FIGS. 22 to 24 and 27, the conductive via 25 extends through the first base layer 2. The conductive via 25 is configured to extend through the first base layer 2, so that the liquid conductive member 26 can be poured into the conductive via 25 from the top along a side of the electrochromic device adjacent to the conductive via 25. In this manner, the electrical connection of the conductive member 26 to the first transparent conductive layer 202 and the second conductive region 4022 is more stable.

In an exemplary embodiment, as shown in FIG. 23, at least part of a surface of the top of the conductive member 26 is beyond the conductive via 25 and covers at least part of the surface of the first base layer 2 facing away from the electrochromic layer 3. Therefore, the bonding of the conductive member 26 to the end of the first substrate layer 201 are not easily cracked, which avoids the failure of the electrical connection of the first transparent conductive layer 202 to the second conductive region 4022, so that the bonding effect between the conductive member 26 and the first substrate layer 201 is better and the production yield is improved.

In an exemplary embodiment, as shown in FIGS. 22 and 23, at least part of a surface of a periphery of the conducting member 26 is not adjacent to the electrochromic layer 3. When the conductive via 25 is formed, for example, a region of the first base layer 2 corresponding to the conductive via 25 may be removed by laser cutting, and then the material of the electrochromic layer 3 in the conductive via 25 may be removed by wiping. As shown in FIGS. 22 and 23, the right side of the conductive via 25 is not blocked by a material or the like, so that the process method of removing part of the first base layer 2 and the electrochromic layer 3 in the conductive via 2 is easier and the product yield is improved. In terms of structures as shown in FIGS. 22 and 23, the conductive member 26 covers a sidewall on the left side of the conductive via 25 and is attached to a side of the first base layer 2 and the electrochromic layer 3, so that the first transparent conductive layer 202 and the second conductive region 4022 are electrically connected.

In an exemplary embodiment, to prevent the conductive member 26 from cracking from a side of the first base layer 2 and the electrochromic layer 3, the top of the conductive member 26 partially covers on the surface of the first base layer 2, so as to strengthen the connection stability of the conductive member 26 to the side of the first base layer 2 and to the side of the electrochromic layer 3, ensure the reliability of the electrical connection of the first transparent conductive layer 202 to the second conductive region 4022, and avoid failure of the product due to open circuit, thereby improving the product yield.

In some embodiments, as shown in FIGS. 22 to 27, the electrochromic device further includes a conductor 27 disposed at at least one of the following positions: on a surface of the first transparent conductive layer 202 and in the electrochromic layer 3, and the conductor 27 is connected to the conductive member 26. A provision of the conductor 27 helps to quickly transfer electrons from the conductive member 26 to the entire first transparent conductive layer 202, so that the speed of conduction is accelerated, so does the speed of discoloration of the electrochromic device.

In an exemplary embodiment, the conductor 27 adopts a metal material with high conductivity, such as any one or at least a combination of at least two of conductive silver paste, conductive copper paste, conductive carbon paste, nano-silver conductive ink, copper foil, copper wire and conductive adhesive film. Optional but non-limiting combinations include a combination of conductive silver paste and conductive copper paste, a combination of conductive copper paste and conductive carbon paste, a combination of conductive carbon paste and nano-silver conductive ink, a combination of nano-silver conductive ink and conductive adhesive film, a combination of copper foil and copper wire, a combination of conductive silver paste, conductive copper paste and conductive carbon paste, a combination of conductive silver paste, conductive carbon paste and nano-silver conductive ink, a combination of conductive copper paste, conductive carbon paste and conductive adhesive film or a combination of conductive silver paste, conductive copper paste, conductive carbon paste, nano-silver conductive ink, copper wire, copper foil and conductive adhesive film. Optional is conductive silver paste.

Figure 26:
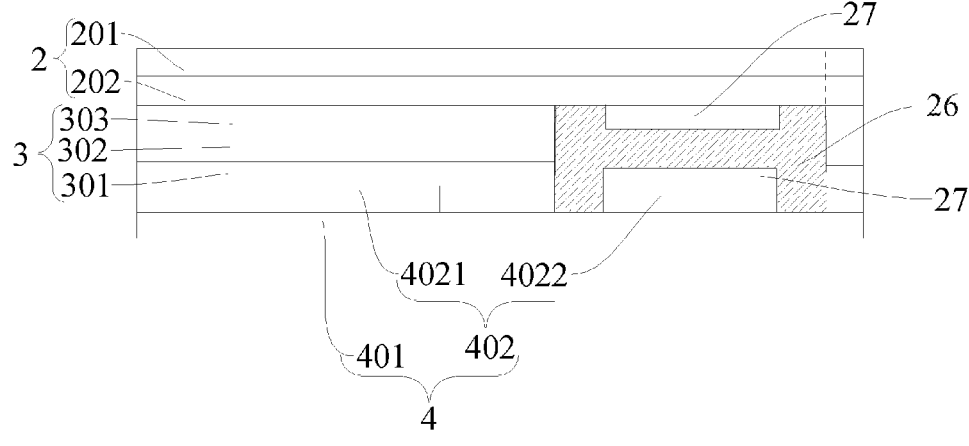
FIG. 26 is a diagram illustrating the structure of an electrochromic device according to an embodiment of the present application.
Figure 27:
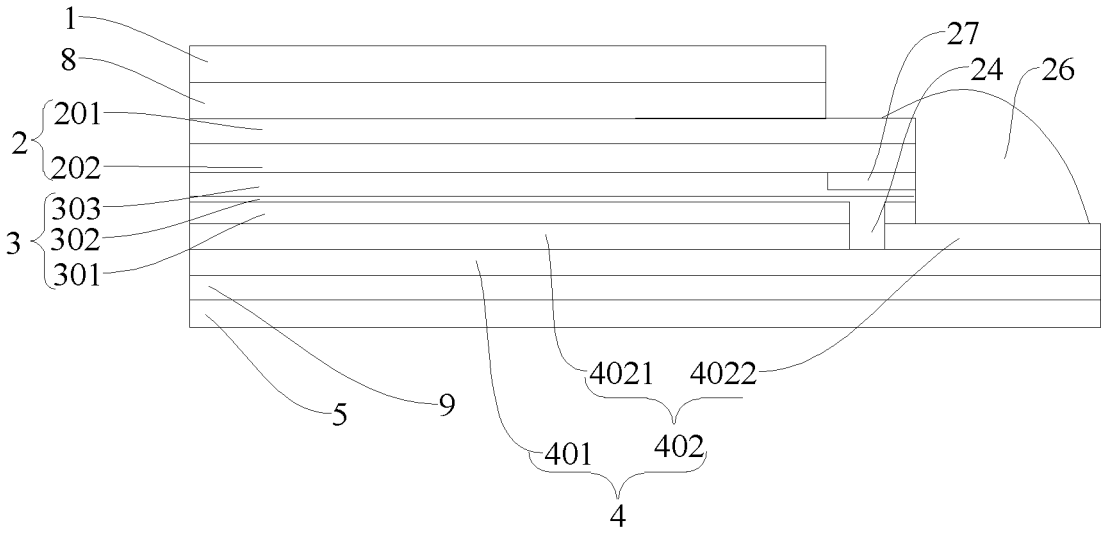
FIG. 27 is a diagram illustrating the structure of an electrochromic device according to an embodiment of the present application.
Figure 28:
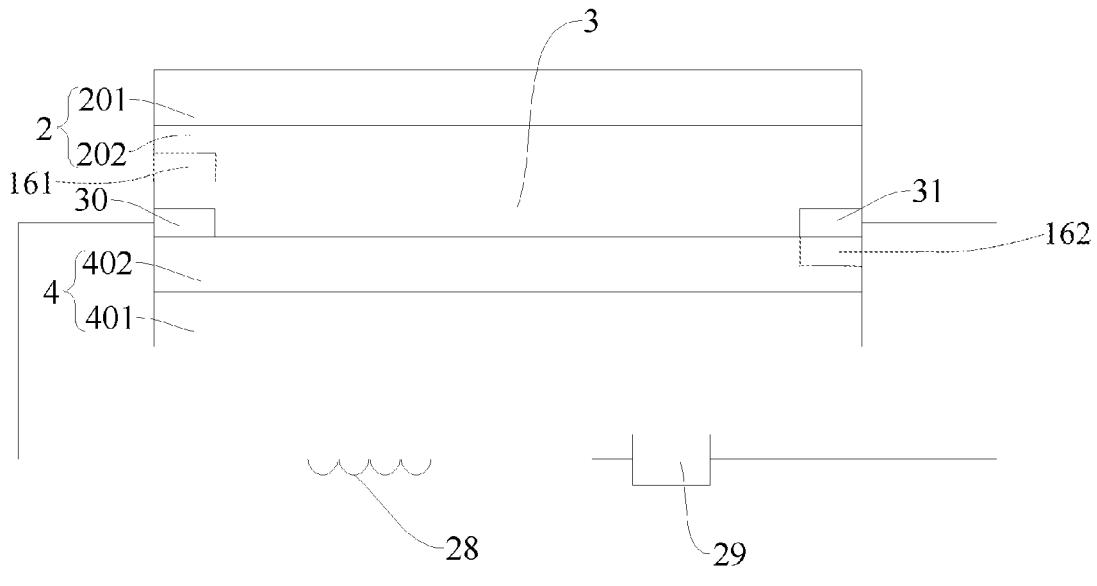
FIG. 28 is a diagram illustrating the structure of an electrochromic device according to an embodiment of the present application.

In an exemplary embodiment, as shown in FIGS. 25-26, the top of the conductive member 26 is covered by the first base layer 2. In a manufacturing process, etch at first at least two adjacent sides of the first base layer 2 corresponding to the top of the conductive via 25, lift or take out the etched part of the first base layer 2, use a needle to grout the conductive member 26 into the conductive via 25, and then fix the first base layer 2 in the original position, so that the top of the conductive member 26 can be covered by the first base layer 2. In this manner, the contact area between the conductive member 26 and the conductor 27 is larger, which improves the conduction yield.

In some embodiments, as shown in FIGS. 28 to 32, the first base layer 2 includes a first wiring region 161, and a first electrode 30 is led out from the first wiring region 161. The second base layer 4 includes a second wiring region 162, and a second electrode 31 is led out from the second wiring region 162. The electrochromic device further includes a wireless receiving coil 28 and an AC/DC converter circuit 29. A first end of the wireless receiving coil 28 is connected to the first electrode 30, a second end of the wireless receiving coil 28 is connected to the second electrode 31 through the AC/DC converter circuit 29, and the wireless receiving coil 28 is configured to receive a signal transmitted by an external wireless transmitting coil to wirelessly charge the electrochromic device.

In an embodiment, the electrochromic layer 3 may include an electrochromic material layer 301, an electrolyte layer 302 and an ion storage layer 303. By applying a voltage between the first base layer 2 and the second base layer 4, the ions move between the electrochromic material layer 301 and the ion storage layer 303, thereby changing the transmittance of the electrochromic device. To facilitate the application of a voltage between the first base layer 2 and the second base layer 4, a first electrode 30 may be led out from the first base layer 2 and a second electrode 31 may be led out from the second base layer 4. For the convenience of lead-out, a first wiring region 161 is disposed on a surface of the first base layer 2 adjacent to the electrochromic layer 3, and a second wiring region 162 is disposed on a surface of the second base layer 4 adjacent to the electrochromic layer 3. The wireless receiving coil 28 may receive signals transmitted by an external wireless transmitting coil. In actual operation, a wireless charging signal may be transmitted through a control terminal with a wireless transmitting coil, such as a mobile phone or a wireless charger. When the control terminal is brought close to the wireless receiving coil 28, the wireless transmitting coil may generate a certain current in the wireless receiving coil 28 through electromagnetic induction based on alternating current of a certain frequency, so that the electric energy can be wirelessly transferred from the control terminal to the electrochromic device. At the same time, since the electrochromic device generally works with a direct current, it is necessary to convert an alternating current generated by the wireless receiving coil 28 into a direct current through an AC/DC converter circuit 29, connect a first end of the wireless receiving coil 28 to a second electrode 31, and connect a second end of the wireless receiving coil 28 to a first electrode 30 through the AC/DC converter circuit 29, so that the electrochromic device can be normally supplied with power. The AC/DC converter circuit 29 in the embodiment of the present application may adopt the related techniques to achieve the above-mentioned functions, and details of specific circuit are not repeated herein. To sum up, the electrochromic device of the embodiment of the present application features a function of wireless charging, thus making it convenient for post-installation structure when the electrochromic device is applied, reducing the design difficulty of applying the electrochromic device, and avoiding accidents caused by line leakage due to the damage or aging of the outer skin of the wire by omitting the wire connection.

Figure 29:
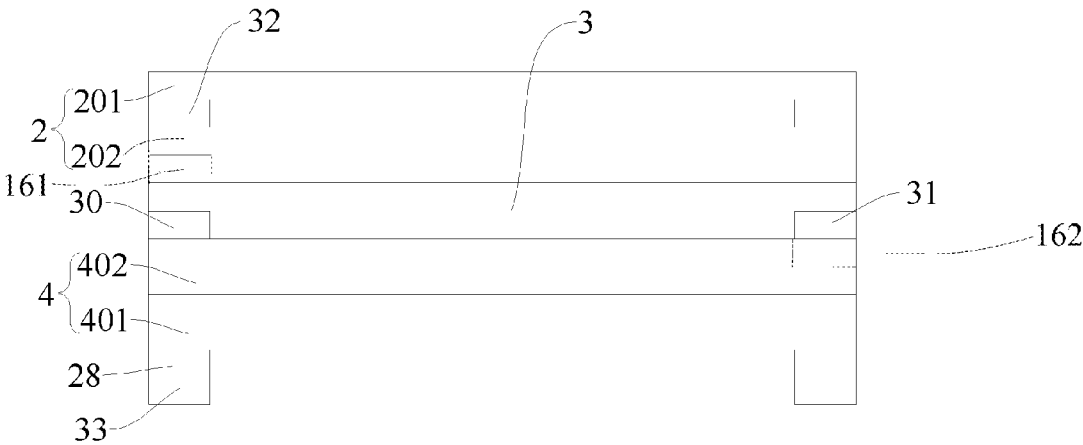
FIG. 29 is a diagram illustrating the structure of an electrochromic device according to an embodiment of the present application.

In an exemplary embodiment, as shown in FIG. 29, the wireless receiving coil 28 is disposed on a surface of the first base layer 2 facing away from the electrochromic layer 3. Alternatively, the wireless receiving coil 28 is disposed on a surface of the second base layer 4 facing away from the electrochromic layer 3. The wireless receiving coil 28 is disposed outside the electrochromic device, so that the wireless receiving coil 28 can be added to the existing electrochromic device, and therefore the production process is simplified.

In an exemplary embodiment, the first wiring region 161 and the second wiring region 162 are coated with a highly conductive material, and then the first electrode 30 and the second electrode 31 are led out through the highly conductive material. In this manner, the voltage conduction efficiency on the first base layer 2 and the second base layer 4 can be increased, and the uniformity of the electric field between the first base layer 2 and the second base layer 4 can be improved. The highly conductive material may be a material with conductivity well known to those skilled in the art, such as any one or a combination of at least two of conductive silver paste, conductive copper paste, conductive carbon paste, nano-silver conductive ink, copper foil, copper wire and conductive adhesive film.

In an exemplary embodiment, the first wiring region 161 and the second wiring region 162 may be disposed in an upper and lower ring-shaped distribution, or may be at the edges of each conductive layer at diagonal angles of L-type, as long as the first wiring region 161 and the second wiring region 162 are not in contact with each other and cause a short-circuit.

In an exemplary embodiment, the first electrode 30 and the second electrode 31 may be wires so that the connection of the first electrode 30 to the first wiring region 161 and the connection of the second electrode 31 to the second wiring region 162 are easier, thereby facilitating the manufacturing of the electrochromic device.

In some embodiments, the first wiring region 161 and the second wiring region 162 constitute a wiring region 16 of the electrochromic device, and a projection of the wireless receiving coil 28 on the first base layer 2 partially or completely coincides with a projection of the wiring region 16 on the first base layer 2. The wiring region 16 and the wireless receiving coil 28 both affect the transmittance of the electrochromic device. In the embodiment of the present application, a projection of the wireless receiving coil 28 on the first base layer 2 partially or completely coincides with a projection of the wiring region 16 on the first base layer 2, so that the wiring region 16 and the wireless receiving coil 28 overlap as much as possible in a superposition direction, thereby reducing the region needed to be shielded and increasing the usable area of the electrochromic device.

In an exemplary embodiment, the wiring region 16 is usually disposed on an edge of the first base layer 2 and the second base layer 4, so that the first electrode 30 and the second electrode 31 can be easily led out. The wireless receiving coil 28 may also be wound from an edge of the electrochromic device, so that the wireless receiving coil 28 may partially or completely coincides with the wiring region 16 in a superimposition direction, thereby reducing the region needed to be shielded and increasing the usable area of the electrochromic device.

In some embodiments, as shown in FIG. 29, the electrochromic device further includes at least one of a first shielding layer 32 and a second shielding layer 33, and at least one of the first shielding layer 32 and the second shielding layer 33 is configured to shield the first wiring region 161, the second wiring region 162, and the wireless receiving coil 28 in a superposition direction. In the superposition direction, the first wiring region 161, the second wiring region 162 and the region where the wireless receiving coil 28 is located cannot transmit light or achieve the effect of discoloration. The electrochromic device of the embodiment of the present application is provided with a first shielding layer 32 and a second shielding layer 33, so that the electrochromic device is more beautiful as a whole, use effect of the electrochromic device is improved, and protection is provided for the wireless receiving coil 28 disposed on the outside.

In an exemplary embodiment, the width of the wireless receiving coil 28 is less than or equal to the width of at least one of the first shielding layer 32 and the second shielding layer 33 to ensure the shielding effect of the shielding layer.

In an exemplary embodiment, the width of the wireless receiving coil 28 is equal to that of the wiring region 16. For example, the width of the first wiring region 161 and the width of the second wiring region 162 are both equal to that of the wireless receiving coil 28. In this manner, a first shielding layer 32 and a second shielding layer 33 of the same width or slightly wider width may be correspondingly provided, thereby reducing the region needed to be shielded and increasing the usable area of the electrochromic device.

In an exemplary embodiment, the first shielding layer 32 is disposed in the first base layer 2 or on a surface of the first base layer 2 facing away from the electrochromic layer 3. The second shielding layer 33 is disposed in the second base layer 4 or on a surface of the second base layer 4 facing away from the electrochromic layer 3. In this manner, positions of the first shielding layer 32 and the second shielding layer 33 may be configured according to actual needs, so that the electrochromic device can meet different use requirements.

Figure 30:
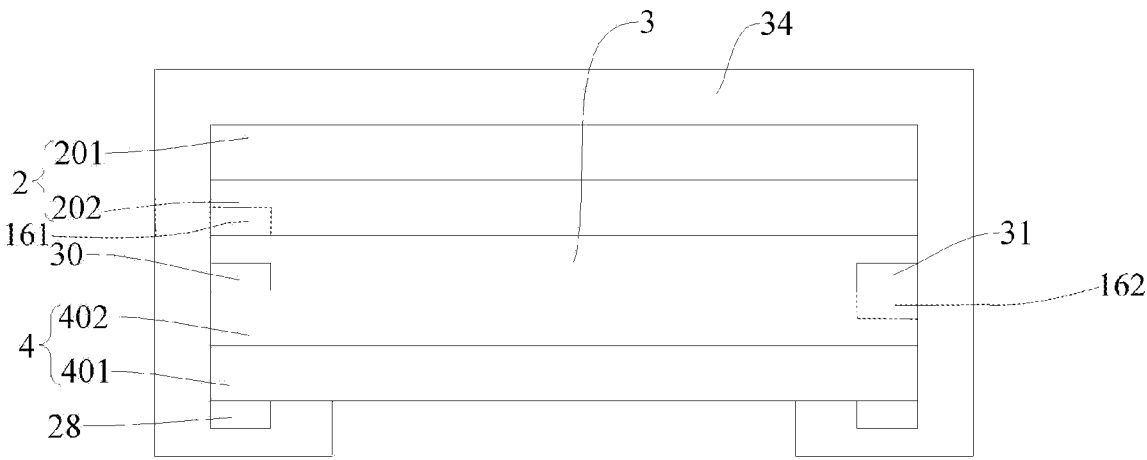
FIG. 30 is a diagram illustrating the structure of an electrochromic device according to an embodiment of the present application.
Figure 31:
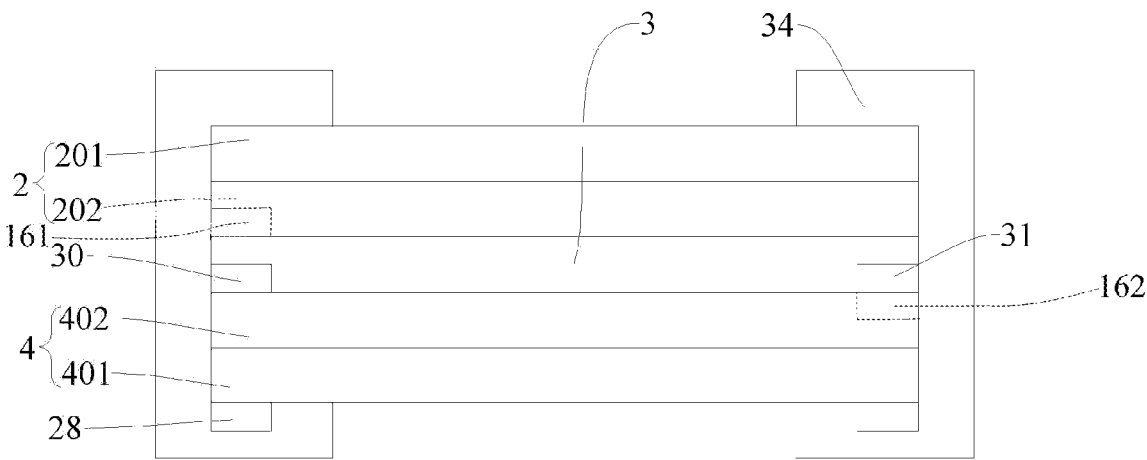
FIG. 31 is a diagram illustrating the structure of an electrochromic device according to an embodiment of the present application.

In some embodiments, as shown in FIGS. 30 and 31, the electrochromic device further includes a third external protective layer 34. The first base layer 2, the electrochromic layer 3, the second base layer 4 and the wireless receiving coil 28 are all located on a radially inward of the third outer protective layer 34. Therefore, the first base layer 2, the electrochromic layer 3, the second base layer 4 and the wireless receiving coil 28 can be well protected and the serviceability of the electrochromic device is ensured.

Figure 32:
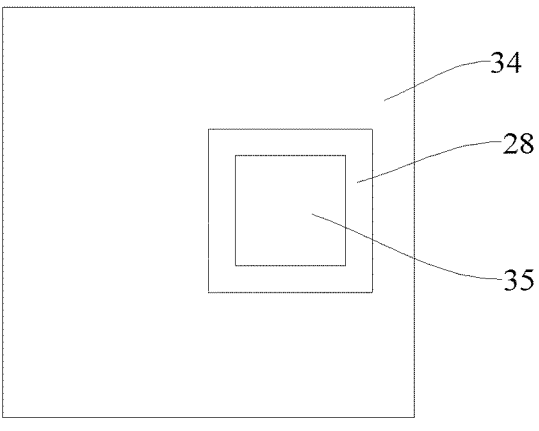
FIG. 32 is a diagram illustrating the structure of an electrochromic device according to an embodiment of the present application.

In an exemplary embodiment, as shown in FIG. 32, the third external protective layer 34 includes a preset hole 35. The wireless receiving coil 28 is disposed on an edge of the preset hole 35, or in an inner periphery of the third external protective layer 34, or on an edge of the preset hole 35 and an inner periphery of the third external protective layer 34. An example is shown in FIG. 32 that the wireless receiving coil 28 is disposed on an edge of the preset hole 35. The preset hole 35 may be configured to avoid functional components on a product, such as a key hole, a handle, a touch sensor, a light sensor, and a camera. For example, if functional components are disposed on a product panel, it is usually necessary to include a preset hole 35 in the third external protective layer 34 to conveniently use the functional components, then the wireless receiving coil 28 can be disposed on an edge of the preset hole 35, and the third external protective layer 34 may also extend to the inside of the third external protective layer 34 along the wireless receiving coil 28 at an edge of the preset hole 35 to wrap the wireless receiving coil 28. By configuring the wireless receiving coil 28 on the edge of the preset hole 35, the effective usable area of the electrochromic device is increased and the influence on the appearance of the electrochromic protector is reduced.

In an exemplary embodiment, as shown in FIGS. 27-32, the first wiring region 161 is disposed on a surface of the first base layer 2 adjacent to the electrochromic layer 3 and near an edge of the preset hole 35, and the second wiring region 162 is disposed on a surface of the second base layer 4 adjacent to of the electrochromic layer 3 and near an edge of the preset hole 35. In this manner, the first wiring region 161 and the second wiring region 162 can be configured to coincide with the wireless receiving coil 28 as much as possible in a superposition direction. Since an edge of the electrochromic device at an opening needs to be provided with a corresponding sealing region to seal the electrochromic device at the opening, a shielding layer needs to be disposed on an edge area of the third external protective layer 34 corresponding to the preset hole 35 to shield the sealing region, and at the same time, to shield the wireless receiving coil 28. In this manner, on the basis of reduced influence on the appearance of the electrochromic protector, the distance between the first electrode 30 led out from the first wiring region 161 and the wireless receiving coil 28, and the distance between the second electrode 31 led out from the second wiring region 162 and the wireless receiving coil 28 are reduced, thereby facilitating the connection of the first electrode 30 to the wireless receiving coil 28, and of the second electrode 31 to the wireless receiving coil 28.

For the electrochromic device of the embodiment of the present application, the first additional layer 1 is disposed on an outer surface of the first base layer 2 and the second additional layer 5 is disposed on an outer surface of the second base layer 4, so that barrier performance to water and oxygen of the electrochromic device is improved, adverse effects of water and oxygen on the electrochromic layer is better avoided, and the serviceability of the electrochromic layer 3 is ensured. A first sealing element 6 is disposed around the electrochromic layer 3 and on the second base layer 4, so that the phenomenon that the external water vapor and oxygen enter the electrochromic layer 3 from a side of the electrochromic layer 3 and affect the stability of the electrochromic layer 3 is better avoided, thereby better protecting the electrochromic device, reducing the probability of cracking and falling off of the first sealing element 6, enhancing the connection stability of the first base layer 2 to the first additional layer 1, and reducing the probability of falling off of the first additional layer 1.

Figure 33:
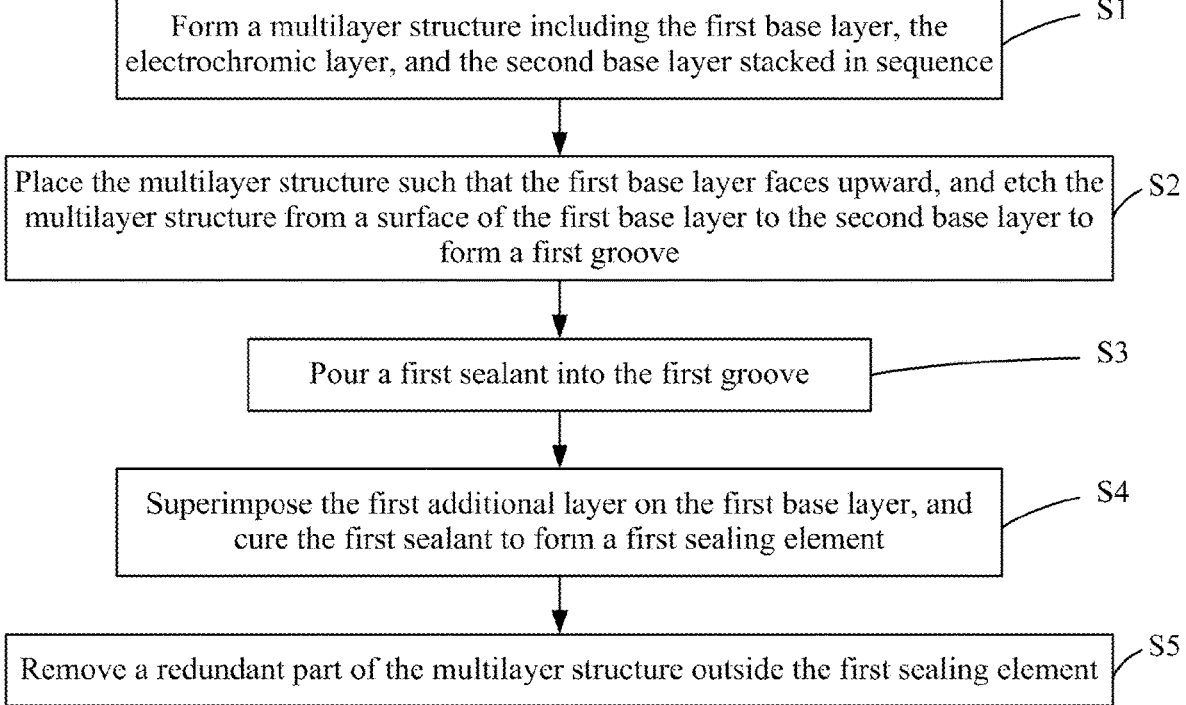
FIG. 33 is a flowchart of a manufacturing method for an electrochromic device according to an embodiment of the present application.

The present application also provides a manufacturing method for an electrochromic device, as shown in FIG. 33, the method of the electrochromic device includes S1 to S5.

In S1, a multilayer structure is formed including a first base layer 2, an electrochromic layer 3 and a second base layer 4 that are stacked in sequence.

Exemplarily, S1 includes S11 to S14.

In S11, a first transparent conductive layer 202 is formed on a first substrate layer 201 to form the first base layer 2, and a second transparent conductive layer 402 is formed on a second substrate layer 401 to form the second base layer 4. Exemplarily, the first transparent conductive layer 202 and the second transparent conductive layer 402 are respectively formed on the first substrate layer 201 and the second substrate layer 401 by magnetron sputtering (or vacuum evaporation deposition, sol-gel deposition, or chemical vapor deposition).

In S12, an electrochromic material is coated on the second transparent conductive layer 402. Exemplarily, 500 mg of poly (3-hexylthiophene) (P3HT) is dissolved in 10 mL of o-xylene and magnetically stirred for 10 hours, and then the resulting solution is dropped onto the second transparent conductive layer 402 to form an electrochromic material layer 301 by spin coating.

In S13, an ion storage layer 303 is coated on the first transparent conductive layer 202. Exemplarily, 500 mg of tungsten trioxide is dissolved in 20 mL of deionized water, and after stirring and filtration, the resulting solution is dropped onto the first transparent conductive layer 202 to obtain the ion storage layer 303 by forming a tungsten trioxide coating by spin coating.

In S14, compounding is practiced. Exemplarily, 20 wt % lithium perchlorate, 59.9 wt % methyl methacrylate, 20 wt % propylene carbonate and 0.1 wt % azobisisobutyronitrile are mixed to coat on the ion storage layer 303 to form an electrolyte layer 302, then the above-mentioned electrochromic material layer 301 (together with the second base layer 4) is placed to cover on the electrolyte layer 302, and the electrolyte layer 302 is UV cured to form an all-solid polymer electrolyte layer 302.

In S2, the multilayer structure is placed such that the first base layer 2 faces upward, and the multilayer structure is etched from a surface of the first base layer 2 to the second base layer 4 to form a first groove.

In S3, a first sealant is poured into the first groove.

In S4, the first additional layer 1 is superimposed on the first base layer 2, and the first sealant is cured to form the first sealing element 6.

In S5, the redundant part of the multilayer structure is removed outside the first sealing element 6.

In the manufacturing process, the first sealing element 6 is formed in the first groove, which not only facilitates the pouring of the first sealant, but also avoids the overflow of the first sealant. In addition, the first sealing element 6, the first base layer 2, the second base layer 4 and the first additional layer 1 all feature good connection stability when the curing is completed, which reduces the probability of cracking and falling off of the first sealing element 6 after removing the redundant part of the multilayer structure outside the first sealing element 6.

In forming the first groove by etching, if the second base layer 4 is disposed at an uttermost side of the entire multilayer structure, a surface of the second base layer 4 down to the first base layer 2 is etched to form the first groove. If an outer side of the second base layer 4 is further provided with other additional layers, a surface of the other additional layers down to the first base layer 2 is etched to form the first groove.

In an exemplary embodiment, the multilayer structure formed in S1 further includes a first adhesive layer 8 and a first additional layer 1 disposed on the first base layer 2. Therefore, the added first additional layer 1 can better protect the first base layer 2 and achieve other optical functions, thereby expanding the application scope of the electrochromic element. When the multilayer structure further includes the first adhesive layer 8 and the first additional layer 1 disposed on the first base layer 2, a surface of the first additional layer 1 to the second base layer 4 is etched to form a first groove.

In an exemplary embodiment, the multilayer structure formed in S1 further includes a first adhesive layer 8 and a first additional layer 1 disposed on the first base layer 2, and a removable first external protective layer 10 attached to the first additional layer 1. When the multilayer structure further includes a first adhesive layer 8, a first additional layer 1, and a removable first external protective layer 10, the surface from the first external protective layer 10 down to the second base layer 4 is etched to form a first groove during processing.

In an exemplary embodiment, the step below is also included after S5.

In S6, a second additional layer 5 is adhered to the outside of the second base layer 4 by a second adhesive layer 9. Thus, the second base layer 4 is well protected.

Figure 34:
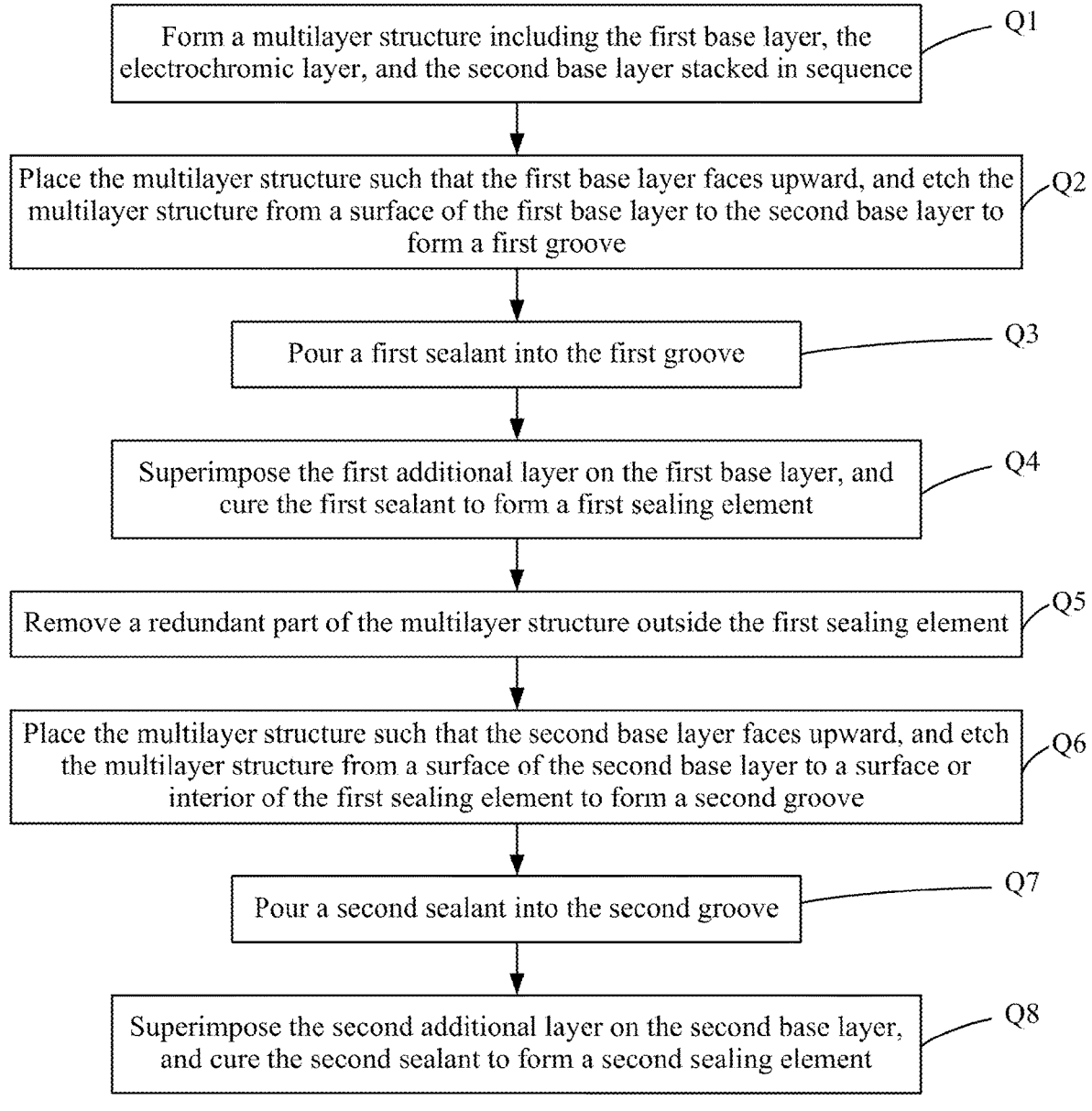
FIG. 34 is a flowchart of a manufacturing method for an electrochromic device according to another embodiment of the present application.

The present application also provides another manufacturing method for an electrochromic device. As shown in FIG. 34, the manufacturing method for an electrochromic device includes the steps Q1 to Q8 below.

In Q1, a multilayer structure is formed including a first base layer 2, an electrochromic layer 3 and a second base layer 4 stacked in sequence.

In Q2, the multilayer structure is placed such that the first base layer 2 faces upward, and the multilayer structure is etched from a surface of the first base layer 2 to the second base layer 4 to form a first groove.

In Q3, a first sealant is poured into the first groove.

In Q4: the first additional layer 1 is superimposed on the first base layer 2, and the first sealant is cured to form the first sealing element 6.

In Q5, the redundant part of the multilayer structure is removed outside the first sealing element 6.

In Q6, the multilayer structure is placed such that the second base layer 4 faces upward, and the multilayer structure is etched from a surface of the second base layer 4 to a surface or interior of the first sealing element 6 to form a second groove.

In Q7, a second sealant is poured into the second groove.

In Q8, the second additional layer 5 is superimposed on the second base layer 4, and the second sealant is cured to form the second sealing element 7.

For a specific flow of Q1, see S11 to S14 above, and details are not described herein.

In the method of manufacturing an electrochromic device of the embodiment of the present application, a surface from the first base layer 2 to the second base layer 4 is etched to form a first groove and a first sealing element is formed in the first groove; a surface from the second base layer 4 to the first sealing element 6 is etched to form a second groove and a second sealing element 7 is formed in the second groove. In this manner, the process of manufacturing the electrochromic device is simplified, the connection stability of the first sealing element 6 to the first base layer 2, the connection stability of the second base layer 4 to the first additional layer 1, the connection stability of the second sealing element 7 to the second base layer 4 and to the second additional layer 5 is improved, the probability of cracking of the first sealing element 6 and the second sealing element 7 is reduced, and the serviceability of the electrochromic device is thus improved.

In some embodiments, the multilayer structure formed in Q1 further includes a first adhesive layer 8 and a first additional layer 1 disposed on the first base layer 2. Therefore, the added first additional layer 1 can better protect the first base layer 2 and achieve other optical functions, thereby expanding the application scope of the electrochromic element. When the multilayer structure further includes the first adhesive layer 8 and the first additional layer 1 disposed on the first base layer 2, the multilayer structure is etched from the surface of the first additional layer 1 to the second base layer to form the first groove in the process.

In an exemplary embodiment, the step below is also included after Q8.

In Q9, a second additional layer 5 is adhered to the outside of the second base layer 4 by a second adhesive layer 9. Thus, the second base layer 4 is well protected.

In some embodiments, both Q3 and Q7 are performed in a vacuum environment. Therefore, air bubbles in the first sealing element 6 and the second sealing element 7 are better avoided, and the sealing performance and stability of the two is ensured.

In the description of the specification, the description of reference terms such as "some embodiments" and "other embodiments" is intended to mean that specific features, structures, materials, or characteristics described in conjunction with such embodiments or examples are included in at least one embodiment or example of the present application. In the specification, the illustrative description of the preceding terms does not necessarily refer to the same embodiment or example. Moreover, the described specific features, structures, materials or characteristics may be combined in an appropriate manner in any one or more embodiments or examples.

What is claimed is:

1. An electrochromic device, comprising a first additional layer, a first base layer, an electrochromic layer, a second base layer, and a second additional layer that are stacked, wherein:

two ends of the electrochromic layer are flush with two ends of the first base layer, two ends of the second base layer and two ends of the second additional layer are disposed beyond the two ends of the electrochromic layer, and a first sealing element is disposed around the electrochromic layer and on the second base layer;

the electrochromic device further comprises a second sealing element embedded in the second base layer, wherein one end of the second sealing element abuts on the first sealing element, or one end of the second sealing element is embedded in the first sealing element;

the second sealing element is an adhesive that is an insulator, a water-oxygen barrier and comprises any one of a pressure-sensitive adhesive, a hot melt adhesive, a UV light-curing adhesive, a heat-curing adhesive, and a UV thermal dual-curing adhesive; and the second base layer is provided with a sealing groove extending in a peripheral direction of the second base layer and arranged to surround the electrochromic layer, the sealing groove is discontinuous on only one side of the second base layer in the peripheral direction to define two spaced ends, and the sealing groove is filled with the second sealing element along the sealing groove from one of the two spaced ends to the other of the two spaced ends.

2. The electrochromic device according to claim 1, wherein:

the first sealing element comprises a first sealing part and a second sealing part, the first sealing part is disposed circumferentially in a peripheral area of the electrochromic layer, a first end of the first sealing part is connected to the second base layer, and a second end of the first sealing part is connected to the second sealing part; and the electrochromic device comprises one of the following: the second sealing part is located outside the first base layer;

at least part of the second sealing part is embedded in the first base layer, and a surface of the second sealing part facing away from the electrochromic layer is located outside a surface of the first baser layer facing away from the electrochromic layer; or at least part of the second sealing part is embedded in the first base layer, and a surface of the second sealing part facing away from the electrochromic layer is flush with a surface of the first base layer facing away from the electrochromic layer.

3. The electrochromic device according to claim 1 wherein a first adhesive layer is disposed on a side of the first base layer facing the first additional layer, and a second adhesive layer is disposed on a side of the second base layer facing the second additional layer.

4. The electrochromic device according to claim 1, further comprising a cover plate, wherein the first additional layer, the first base layer, the electrochromic layer, the second base layer, and the second additional layer constitute a body, the cover plate is disposed on at least one surface of the body, the body comprises a first electrochromic region and a wiring region, and the wiring region is disposed around first electrochromic region; and a region of the cover plate corresponding to the wiring region in a first direction is a first region, a region of the cover plate corresponding to the first electrochromic region in the first direction is a second region, a surface roughness within the first region of the cover plate is ≥0.6 μm, and a surface roughness within the second region of the cover plate is <0.6 μm.

5. The electrochromic device according to claim 4, wherein the cover plate has at least one of the following characteristics:

the surface roughness within the first region of the cover plate gradually decreases in a direction from the first region to the second region;

within a region located in the second region and at a distance of less than a preset width from a periphery of the second region, a surface roughness of the cover plate gradually decreases in a direction from the periphery of the second region to a center of the second region;

and within a region located in the second region and at a distance of greater than or equal to the preset width from the periphery of the second region, the surface roughness of the cover plate is uniform.

6. The electrochromic device according to claim 1, wherein the first base layer and the second base layer each comprise a conductive multilayer structure and a base substrate layer stacked in sequence, wherein the conductive multilayer structure is disposed on a surface of the electrochromic layer;

the conductive multilayer structure comprises a base protective layer, a base conductive layer, and an underlayer stacked in sequence, wherein the base protective layer is disposed adjacent to the electrochromic layer; and the conductive multilayer structure further comprises a barrier layer disposed at least one of the following positions: between the electrochromic layer and the base protective layer, between the underlayer and the base substrate layer, and on a surface of the base substrate layer facing away from the electrochromic layer.

7. The electrochromic device according to claim 6, wherein a surface of the barrier layer facing away from the base substrate layer is a concave-convex textured surface.

8. The electrochromic device according to claim 6, wherein the conductive multilayer structure further comprises at least one of an ink layer and a color layer, wherein the at least one of the ink layer and the color layer is disposed on the surface of the base substrate layer facing away from the electrochromic layer, and a surface of the color layer facing away from the base substrate layer is a concave-convex textured surface.

9. The electrochromic device according to claim 6, wherein the base protective layer is a monolayer or multilayer structure formed by a layer or layers selected from a nickel-chromium alloy layer, a silicon nitride layer, an aluminum nitride layer, and a titanium nitride layer;

the underlayer is a monolayer or multilayer structure formed by a layer or layers selected from a silicon nitride layer, a silicon oxide layer, and a nickel-chromium alloy layer;

the barrier layer is a monolayer or multilayer structure formed by a layer or layers selected from a silicon dioxide layer, the silicon nitride layer, a niobium oxide layer, a titanium oxide layer, an aluminum oxide layer, and an indium tin zinc oxide layer; and the base conductive layer is a monolayer or multilayer structure formed by a layer or layers selected from a silver layer, a silver alloy layer, an indium tin oxide layer, and an aluminum zinc oxide layer.

10. The electrochromic device according to claim 1, wherein the first base layer comprises a first transparent conductive layer and a first substrate layer stacked in sequence, the first transparent conductive layer adheres to a first side of the electrochromic layer, the second base layer comprises a second transparent conductive layer and a second substrate layer stacked in sequence, and the second transparent conductive layer adheres to a second side of the electrochromic layer; and a partition groove is formed in the second transparent conductive layer so that the second transparent conductive layer is divided into a first conductive region and a second conductive region which are independent of each other, and at least part of the electrochromic layer corresponding to the second conductive region is removed to form a conductive via, a conductive member is poured into the conductive via, and the conductive member is configured to electrically connect the first transparent conductive layer and the second conductive region.

11. The electrochromic device according to claim 10, wherein at least a surface of the first conductive region facing the partition groove is covered by the electrochromic layer.

12. The electrochromic device according to claim 10, wherein at least part of a surface of a periphery of the conductive member is adjacent to the electrochromic layer.

13. The electrochromic device according to claim 12, wherein the conductive via extends through the first base layer, and at least part of a surface of a top of the conductive member is beyond the conductive via and covers at least part of a surface of the first base layer facing away from the electrochromic layer.

14. The electrochromic device according to claim 12, wherein a top of the conductive member is covered by the first base layer.

15. The electrochromic device according to claim 10, further comprising a conductor disposed at least one of the following positions: on a surface of the first transparent conductive layer and in the electrochromic layer, and the conductor is connected to the conductive member.

16. The electrochromic device according to claim 1, wherein the first base layer comprises a first wiring region, a first electrode is led out from the first wiring region, the second base layer comprises a second wiring region, and a second electrode is led out from the second wiring region; and the electrochromic device further comprises a wireless receiving coil and an AC/DC converter circuit, wherein a first end of the wireless receiving coil is connected to the first electrode, a second end of the wireless receiving coil is connected to the second electrode through the AC/DC converter circuit, and the wireless receiving coil is configured to receive a signal transmitted by an external wireless transmitting coil to wirelessly charge the electrochromic device.

17. The electrochromic device according to claim 16, wherein the first wiring region and the second wiring region constitute a wiring region of the electrochromic device, and a projection of the wireless receiving coil on the first base layer partially or completely coincides with a projection of the wiring region on the first base layer.

18. The electrochromic device of claim 16, further comprising at least one of a first shielding layer or a second shielding layer, wherein the at least one of the first shielding layer and the second shielding layer is configured to shield the first wiring region, the second wiring region, and the wireless receiving coil in a superposition direction of the first wiring region, the second wiring region, and the wireless receiving coil.

* * * * *